US008054533B2

(12) United States Patent
Araki et al.

(10) Patent No.: US 8,054,533 B2

(45) Date of Patent: Nov. 8, 2011

(54) IMAGE RECORD MEDIUM AND IMAGE RECORD APPARATUS

(75) Inventors: Masaaki Araki, Ebina (JP); Tsunemasa Mita, Ebina (JP); Naoki Hiji, Ebina (JP); Yasunori Saito, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 2684 days.

(21) Appl. No.: 10/057,973

(22) Filed: Jan. 29, 2002

(65) Prior Publication Data

US 2003/0103762 A1 Jun. 5, 2003

(30) Foreign Application Priority Data

Jun. 25, 2001 (JP) ................................ 2001-191470
Jun. 25, 2001 (JP) ................................ 2001-191471

(51) Int. Cl.
*G02B 26/00* (2006.01)

(52) U.S. Cl. ............. 359/296; 345/87; 345/105; 349/24

(58) Field of Classification Search .................. 345/296, 345/105–107; 359/296
See application file for complete search history.

(56) References Cited

U.S. PATENT DOCUMENTS 4,164,365 A * 8/1979 Saxe ............................ 359/296
4,223,308 A * 9/1980 Baraff et al. .................... 345/84
5,329,390 A * 7/1994 Fujiwara et al. ................ 349/27
6,118,572 A * 9/2000 Kostecki et al. .............. 359/265
6,163,348 A 12/2000 Izumi et al.
6,618,102 B2 * 9/2003 Harada et al. .................. 349/78

FOREIGN PATENT DOCUMENTS

| | | | |
|---|---|---|---|
| JP | A 04-068310 | | 3/1992 |
| JP | A 04-355786 | | 12/1992 |
| JP | 5-165002 | A | 6/1993 |
| JP | A 06-274458 | | 9/1994 |
| JP | A 08-328032 | | 12/1996 |
| JP | 11-237644 | A | 8/1999 |
| JP | A 2000-111942 | | 4/2000 |
| JP | A 2001-100664 | | 4/2001 |

* cited by examiner

*Primary Examiner* — Kevin M Nguyen
*Assistant Examiner* — Cory Almeida
(74) *Attorney, Agent, or Firm* — Oliff & Berridge, PLC

(57) ABSTRACT

An image record apparatus for recording a visible image on each of image record media 14 has a light application section 30 for applying exposure light to the plurality of placed image record media 14, a voltage application section 20 for applying an image write voltage to each of the plurality of placed image record media 14, and a control section 40 for controlling the light application section 30 and the voltage application section 20 so that exposure light for representing a visible image is applied to the plurality of placed image record media and the image write voltage is applied to the image record medium 14 on which the same visible image as the image is to be recorded.

11 Claims, 18 Drawing Sheets

T1
T2
APPLIED VOLTAGE

INTENSITY OF EXPOSURE LIGHT

REFLECTIVITY

REFLECTIVITY

IMAGE RECORD MEDIUM AND IMAGE RECORD APPARATUS

BACKGROUND OF THE INVENTION

1. Field of the Invention

This invention relates to an image record apparatus for copying information from a display used with an office automation (OA) machine, an information communication terminal, a POS terminal, etc. and a record medium such as paper, an image record method used with the image record apparatus, an image record medium holder, and an image record medium onto which information is written.

2. Description of the Related Art

Hitherto, a display panel formed using a plastic film substrate of a polymer film, etc., has fully showed as a display, etc., of a hand-held electronic machine, the advantages that the display panel is thin and lightweight and can be bent in comparison with a display panel formed using a glass substrate.

Most of all, attention is focused on a liquid crystal display device using a composite of self-hold liquid crystal comprising a cholesteric liquid crystal dispersed in a transparent resin material and a resin because the liquid crystal display device has a stable memory property and can produce high-definition display by simple matrix drive without the need for an active drive circuit required for TFT liquid crystal, etc.

Particularly, the liquid crystal display device provided by making use of a light dispersion mode of a cholesteric liquid crystal capable of providing a high reflection contrast in a light reception type display to provide compatibility between high-speed display and high resolution is free of flicker and thus produces easy-to-see display and makes user's eyes hard to get tired, so that it satisfies the need for being easy on eyes of human beings. In addition, it can memorize the display contents and moreover can display and store information with no power supply and thus also satisfies the need for energy conservation and being friendly to the environment.

Further, a system wherein a composite of self-hold liquid crystal and a resin and a photoconductor are combined into an image record medium and a voltage is applied to the image record medium and exposure light is also applied for displaying a visible image is predominant as a printer, etc., using an image record medium in place of paper and is also predominant as a tool for innovating the former mode in which a hardcopy of information displayed on an electronic display is made before the information is read, and can also realize resource savings and waste reduction by making the most of the feature of being reusable.

Assuming that the user sees the image record medium using liquid crystal with the medium picked up like paper and carries the image record medium with the hand, it is considered that if a record apparatus for applying a voltage to the image record medium and applying exposure light to the image record medium to write information and the image record medium are made separatable for use, the convenience is enhanced.

However, if the image record medium and the record apparatus are separated, the image record medium holds only the currently recorded information like a paper medium and full use of the feature of being repeatedly rewritable is not made.

On the other hand, the record apparatus for applying exposure light while applying a voltage requires both a light emission section for applying exposure light to an image displayed on an image display body including a luminous, electronic display for displaying image information or on a translucent material from behind and a voltage application section for applying a voltage to an image record medium and thus it is not easy to configure the record apparatus as a portable type.

JP-A-Hei. 11-237644 discloses a method of sequentially exposing while moving a laser beam and a light emitting diode array to miniaturize an image record apparatus of an image record medium.

According to the method, it is not necessary to expose the full face of an image record medium at a time and thus the light application section can be miniaturized, thereby miniaturizing the whole image record apparatus.

In this disclosed method, however, writing image information to an image record medium is slowed down and thus the need for displaying image information at high speed cannot be satisfied; this is a problem.

To rewrite new image information onto an image record medium separated from the image record apparatus, the user involves a burdensome procedure of bringing the image record medium into a location where the image record apparatus is placed, setting the image record medium in the image record apparatus, and exposing while applying a voltage. Further, to record the same or different image information on a plurality of image record media and distribute the image record media to a plurality of persons or locations, the burdensome procedure of setting one image record medium at a time in the image record apparatus and applying a voltage to each image record medium and exposing it is also involved. It is considered that the burdensome step of setting an image record medium in the image record apparatus is not eliminated if the image record apparatus is miniaturized to a portable size. To stack a plurality of image record media on each other and expose the image record media from the same light exposure unit for writing an image, it is necessary not only to provide the compatibility between a function of shielding the scene and a function of transmitting exposure light, but also to record an image of similar contrast on each of the stacked image record media.

A sheet enabling an image to be recorded not only on one side, but also on double sides and an image record apparatus for recording an image on both sides of the sheet has been developed.

For example, JP-A-Hei. 5-165002 discloses a double-sided record sheet and a double-sided image record apparatus for recording an image on both sides of the record sheet.

FIG. 17 is a drawing to show the double-sided image record apparatus disclosed in JP-A-5-165002.

In FIG. 17, the double-sided image record apparatus comprises an image record medium 100, light exposure units 102A and 102B, voltage application unit 103, and electrodes 112A and 112B. The image record medium 100 comprises an electrode 112C, substrates 111A and 111B formed on both sides of the electrode 112C and image record layers 104A and 104B for indicating a transparent state and an opaque state depending on light beams different in wavelength in a specific frequency electric field. The image record layer 104A, 104B uses a material including polymeric liquid crystal, monomeric liquid crystal, and photosensitive molecules.

However, when an image recorded on the surface of the image record medium with images recorded on both sides is observed, if the image recorded on the back or the scene through the medium is seen through the surface, the visibility and the display quality of the image are impaired remarkably. Then, it is common practice to place a light shield member between the image record layers on the surface and the back of the medium so that the image on one side is not seen through the other. In the disclosed double-sided image record apparatus, the electrode 112C comprising a metal-evaporated layer and a resin with metal powder or carbon dispersed corresponds substantially to the light shield member.

If such a light shield member is placed, however, light from light exposure unit is also shielded and thus it is necessary to place light exposure unit on both sides of the image record medium or reverse the image record medium after exposing one side to expose the other; there is a problem of upsizing the image record apparatus and increasing the cost.

SUMMARY OF THE INVENTION

It is therefore an object of the invention to provide an image record apparatus, an image record method, an image record medium holder, and an image record medium for making it possible to record the same image information or different image information on a plurality of image record media, eliminate the inconvenience of attaching the image record media one by one to the image record apparatus, and enhance the convenience to record image information on the image record media or rewrite new image information thereonto.

It is another object of the invention to provide a double-sided recordable image record medium by one light exposure unit without reversing the image record medium onto which a visible image can be rewritten repeatedly and an image record apparatus capable of recording on double sides of the image record medium.

To accomplish the above-described object, according to the invention, there is provided an image record apparatus, wherein a plurality of image record media each for recording a visible image upon reception of both irritations of application of exposure light for representing an image and application of a voltage are stacked on each other for placement, for recording a visible image on each of the image record media stacked on each other for placement, the image record apparatus comprising:

a light application section for applying exposure light to the plurality of placed image record media;

a voltage application section for applying an image write voltage to each of the plurality of placed image record media; and a control section for controlling the light application section and the voltage application section so that exposure light for representing an image is applied to the plurality of placed image record media and the image write voltage is applied to the image record medium on which the same visible image as the image is to be recorded.

Preferably, the control section controls the light application section and the voltage application section so that exposure light is applied to the plurality of placed image record media and the image write voltage is applied to the plurality of placed image record media at the same time, thereby recoding the same visible image on each of the image record media.

Preferably, the control section controls the light application section and the voltage application section so that the image write process of applying the exposure light for representing an image to the plurality of placed image record media and applying the image write voltage to the image record medium on which the same visible image as the image is to be recorded is repeated while changing to exposure light for representing a different image and applying the image write voltage to a different image record medium are being conducted, thereby recoding each visible image on each of the image record media.

Further, preferably the control section controls the light application section and the voltage application section so as to reset to record a uniform initial image on the image record medium before the visible image is recorded on the image record medium.

To accomplish the above-described object, according to the invention, there is provided an image record method comprising the steps of:

placing a plurality of image record media on which a visible image is recorded upon reception of both irritations of application of exposure light for representing an image and application of a voltage in a predetermined image write section so as to stack the image record media on each other; and applying exposure light to the image record media placed in the image write section and applying an image write voltage to each of the image record media.

Here, preferably a plurality of image record media different in required light amount of exposure light for recording the same image are provided, and to place the image record media in the image write section so as to stack the image record media on each other, they are placed so that the image record media are stacked on each other in such a manner that the image record medium requiring the smaller light amount is placed on the side to which the exposure light is applied.

To accomplish the above-described object, according to the invention, there is provided an image record medium holder comprising a medium connection section into which a plurality of image record medium are inserted with one end part of one image record medium stacked on that of another image record medium detachably and a connector for applying an image write voltage separately to each of the image record medium inserted into the medium connection section.

To accomplish the above-described object, according to the invention, there is provided an image record medium comprising an image record layer on which a visible image is recorded upon reception of irritation of application of exposure light for representing an image and a functional layer for transmitting the exposure light at least when the exposure light is applied to the image record layer and shielding the scene at least when the visible image recorded on the image record layer is observed.

Here, preferably the functional layer transmits exposure light having a predetermined wavelength range and has light shield performance of shielding the scene.

According to another aspect of the invention, there is provided an image record medium comprising two image record layers on which a visible image is recorded upon reception of irritation of application of exposure light for representing an image and a functional layer being formed at a position sandwiched between the two image record layers for transmitting the exposure light at least when the exposure light is applied to the image record layer and shielding the scene at least when the visible image recorded on the image record layer is observed.

Here, preferably the functional layer transmits exposure light having a predetermined wavelength range and has light shield performance of shielding the scene.

Preferably, the functional layer transmits at least light of the wavelength of the exposure light upon reception of a predetermined irritation and has light shield performance of shielding the scene in a state in which the predetermined irritation is canceled.

Preferably, a visible image is recorded on the image record medium upon reception of irritations of application of exposure light and application of an electric field, and each of the image record layers has a display layer whose optical characteristic changes upon application of an electric field and a photoconductive layer whose electric characteristic changes upon application of the exposure light for representing the image.

Further, the display layers of the image record layers may have different threshold electric fields for changing the optical characteristic.

To accomplish the above-described object, according to the invention, there is provided an image record apparatus for recording a visible image on an image record medium comprising two image record layers on which an image is recorded upon reception of both irritations of application of exposure light for representing an image and application of a voltage and a functional layer being formed at a position sandwiched between the two image record layers for transmitting the exposure light at least when the exposure light is applied to the image record layer and shielding the scene at least when the visible image recorded on the image record layer is observed, the image record apparatus comprising:

a exposure section for applying exposure light to the placed image record medium;

an electric field application section for applying an image write electric field to the image record layer forming a part of the placed image record medium; and a write control section for controlling the exposure section and the electric field application section so that to record a visible image on the first image record layer on the surface side close to an exposure light source, of the two image record layers forming a part of the placed image record medium, exposure light for representing the image to be recorded on the first image record layer is applied to the image record medium and a write electric field and an electric field improper to write are applied to the first image record layer and the second image record layer on the back side away from the exposure light source respectively and that to record a visible image on the second image record layer on the back side, exposure light for representing the image to be recorded on the second image record layer is applied to the image record medium and a write electric field and an electric field improper to write are applied to the second image record layer and the first image record layer respectively.

Here, preferably the exposure section changes the light amount of the exposure light when a visible image is recorded on the first image record layer of the placed image record medium and when a visible image is recorded on the second image record layer.

Preferably, the write control section controls the exposure section and the electric field application section so that a visible image is first recorded on the second image record layer of the placed image record medium and a visible image is next recorded on the first image record layer.

Preferably, before a visible image is recorded on the second image record layer of the placed image record medium, the electric field application section applies a reset electric field for resetting to record a uniform initial image at least to the first image record layer of the first and second image record layers.

Preferably, each of the image record layers has a display layer made of a cholesteric liquid crystal whose optical characteristic changes upon application of an electric field for recording a visible image, and the electric field application section records a visible image on the second image record layer while applying an electric field to the first image record layer.

Further, preferably, when applying exposure light for representing an image to the second image record layer, the exposure section applies exposure light for representing a mirror image of the visible image to be recorded on the second image record layer to the image record medium.

DETAILED DESCRIPTION OF THE PREFERRED EMBODIMENTS

Referring now to the accompanying drawings, there are shown preferred embodiments of image record apparatus of the invention.

Figure 1:
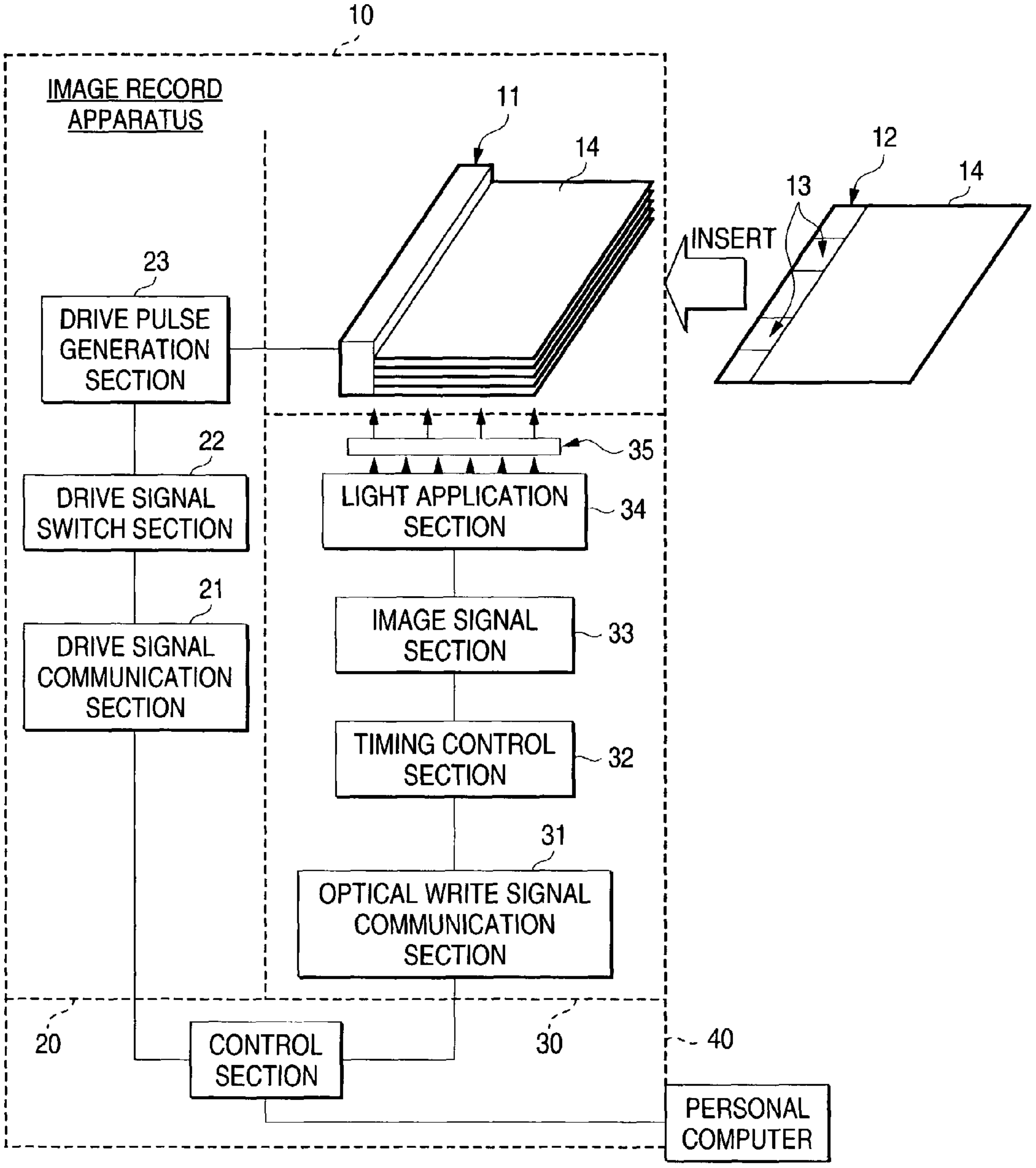
FIG. 1 is a schematic configuration diagram to show an image record apparatus of a first embodiment of the invention.

FIG. 1 is a schematic configuration diagram to show the configuration of an image record apparatus of a first embodiment of the invention.

The embodiment corresponds to the image record apparatus of the first embodiment of the invention, an image record method of an embodiment of the invention, and an image record medium holder of an embodiment of the invention.

The image record apparatus shown in FIG. 1 comprises a voltage application section 20, a exposure section 30, a control section 40, and an image record medium holder 10 for connecting a plurality of image record media 14 and the voltage application section 20. An instruction is given to the image record apparatus through the control section 40 as the operator operates a keyboard or a mouse of a personal computer (PC) connected to the image record apparatus.

The image record medium holder 10 comprises a connector 12 attached to one end part of each of the image record media 14 and having external connection electrodes 13 connected to a pair of electrodes of the image record medium 14 and a medium connection section 11 wherein when the connector 12 is inserted, the external connection electrodes 13 of the connector 12 are connected to the voltage application section 20 of the image record apparatus. The image record medium holder 10 can be attached to or detached from the image record apparatus with a plurality of image record media 14 inserted, and the image record medium holder 10 itself can also be separated from the image record apparatus for carrying.

The control section 40 controls the exposure section 30 and the voltage application section 20 so as to apply proper exposure light and apply a proper image write voltage to each of the plurality of image record media 14 connected to the medium connection section 11 based on the instruction contents given as the PC is operated.

The voltage application section 20 comprises a drive signal communication section 21 for transmitting a command signal issued by the control section 40, a drive signal switch section 22 for switching drive signals for batched voltage application and separate voltage application to each of the image record media 14 inserted into the medium connection section 11 and connected to the voltage application section 20 based on the signal transmitted from the drive signal communication section 21, and a drive pulse generation section 23 for generating a predetermined pulse voltage based on the drive signal and applying the pulse voltage to a predetermined image record medium 14.

The exposure section 30 comprises an optical write signal communication section 31 for transmitting a write signal issued by the control section 40, a timing control circuit 32 for generating a timing signal to apply exposure light to the image record medium 14 based on the signal transmitted from the optical write signal communication section 31, an image signal section 33 for generating an image signal to cause a pattern generation section 35 to display image information as required, a light application section 34 for applying exposure light from behind the pattern generation section 35, and the pattern generation section 35 for displaying an image to be recorded on the image record medium 14.

Thus, the connector 12 is attached to one end part of the image record medium 14 and is inserted into the medium connection section 11 of the image record apparatus, whereby the image record medium 14 can be connected to the voltage application section 20 of the image record apparatus. The image record medium holder 10 with the image record medium 14 inserted into the medium connection section 11 and held can be easily detached from the image record apparatus, so that it is convenient to carry. Rewriting, etc. can also be easily conducted simply by connecting the image record medium holder to the image record apparatus with a plurality of image record media held.

Thus, if the image record media 14 are stacked on each other and set in the image record apparatus through the image record medium holder 10, the same image information can be recorded on the image record media 14 at the same time by one setting.

Next, an image record medium used with the image record apparatus of the first embodiment of the invention will be discussed.

Figure 2:
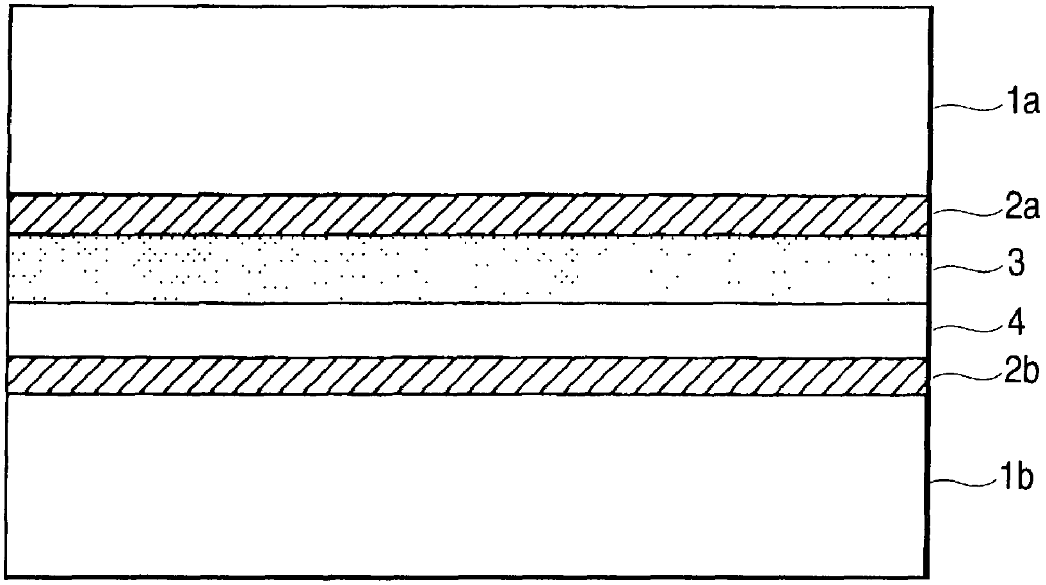
FIG. 2 is a drawing to show a first configuration example of an image record medium used with the image record apparatus of the first embodiment of the invention.

FIG. 2 is a drawing to show a first configuration example of the image record medium used with the image record apparatus of the first embodiment of the invention.

The image record medium shown in FIG. 2 comprises silica or glass or plastic spacer dispersed between a top transparent substrate 1*a* and an organic photoconductor layer 4 on a bottom transparent substrate 1*b* and is controlled so that a liquid crystal layer has a thickness of several μm to several ten μm.

In FIG. 2, the image record medium has the top transparent substrate 1*a* and the bottom transparent substrate 1*b* and the substrates 1*a* and 1*b* are formed with transparent electrodes 2*a* and 2*b* connected to the external connection electrodes of the connector.

The electrode film is not limited if it is a conductive material; preferably a material having both conductivity and transparency is used, and an NESA film, an indium oxide, an ITO (indium tin oxide) film comprising a mixture of indium oxide and tin oxide, or the like is used.

A method of forming the electrode film on the transparent substrate 1*a*, 1*b* is not limited and the electrode film is formed by a method of evaporation, sputtering, etc. A pattern of the electrode film can be formed arbitrarily in response to the required display contents and can be formed as a stripe-like electrode pattern for dot matrix display by etching or a segment display electrode pattern. The stripe-like electrode pattern and the segment display electrode pattern can also be mixed.

A transparent material to visible light can be used as the transparent substrate; for example, soda glass, Corning 7059, etc., is used, but the material is not limited to them. In case of using a flexible substrate as the transparent substrate, as a material of a plastic film substrate, there are used a crystalline polymer of uniaxially or biaxially stretched polyethylene terephthalate, etc., a noncrystalline polymer such as polystyrene and polyether sulfone, polyolefin such as polyethylene and polypropylene, polyamide such as polycarbonate and nylon. The transparent substrate having a thickness of 0.3 mm or less, preferably 20 to 200 μm can be used.

The transparent substrate may be formed on a surface with a functional layer such as an abrasive resistance layer or a gas barrier layer, as required.

Nematic liquid crystal having positive dielectric constant anisotropy such as Schiff base family, azo family, azoxy family, biphenyl family, terphenyl family, ester benzoate family, tran family, pyrimidine family, cyclohexanecarboxylic acid ester family, phenylcyclohexane family, or dioxane family or a material provided by adding to a mixture thereof an optically active chiral agent such as an ester derivative, a cyanobiphenyl derivative, or a bisanil derivative can be used as a cholesteric liquid crystal forming the liquid crystal layer 3.

The helical pitch of the cholesteric liquid crystal is adjusted based on the addition amount of the chiral agent to the nematic liquid crystal. For example, to make a display color blue, the center wavelength of selection reflection is set in a range of 400 to 500 nm; to make a display color green, the center wavelength of selection reflection is set in a range of 500 to 600 nm; and to make a display color red, the center wavelength of selection reflection is set in a range of 600 to 700 nm. A plurality of chiral agents indicating temperature dependency different in helical direction or acting oppositely may be added for the purpose of compensating for the temperature dependency of the helical pitch of the cholesteric liquid crystal.

As a mode in which the liquid crystal layer 3 forms a composite of self-hold liquid crystal and a resin including a cholesteric liquid crystal and a transparent resin, a PNLC (Polymer Network Liquid Crystal) structure containing a net-like resin in a continuous phase of the cholesteric liquid crystal or a PDLC (Polymer Dispread Liquid Crystal) structure comprising the cholesteric liquid crystal dispersed like droplets in the skeleton of a high polymer can be used. The PNLC structure or the PDLC structure can be formed by a method of separating phases of a high polymer and liquid crystal, such as a PIPS (Polymerization Induced Phase Separation) method of mixing a polymeric precursor polymerized by heat and light, an electron ray, etc., such as acrylic family, thiol family, or epoxy family, and liquid crystal to polymerize from a uniform phase state to separate phases, an emulsion method of mixing a high polymer having low liquid crystal solubility, such as polyvinyl alcohol, and liquid crystal and agitating and suspending them to droplet-disperse the liquid crystal in the high polymer, a TIPS (Thermally Induced Phase Separation) method of mixing a thermoplastic high polymer and liquid crystal and cooling from a state heated to a uniform phase to separate phases, or an SIPS (Solvent Induced Phase Separation) method of dissolving a high polymer and liquid crystal in a solvent of chloroform, etc., and evaporating the solvent to separate phases of the high polymer and the liquid crystal, but the invention is not limited to the methods.

As the photoconductor layer 4, any of charge-transfer complex type, eutectic complex type, or lamination type may be used. Specifically, a material comprising a triphenylmethane family compound dispersed in an eutectic body of poly-N-vinylcarbazole/2,4,7-trinitrofluorenone family, pyrylium salt, and polycarbonate, a material formed by separating a charge transport material comprising a monomeric transport substance of charge carrier and charge generation material of organic pigment of azo compound, phthalocyanine compound, etc., dissolved and dispersed in general-purpose resin of polyester, polycarbonate, etc., like layer, or the like can be used. The invention is not limited to the above-mentioned materials so long as the material has a dielectric constant and electric conductivity largely changing functionally upon exposure to specific light.

Figure 3:
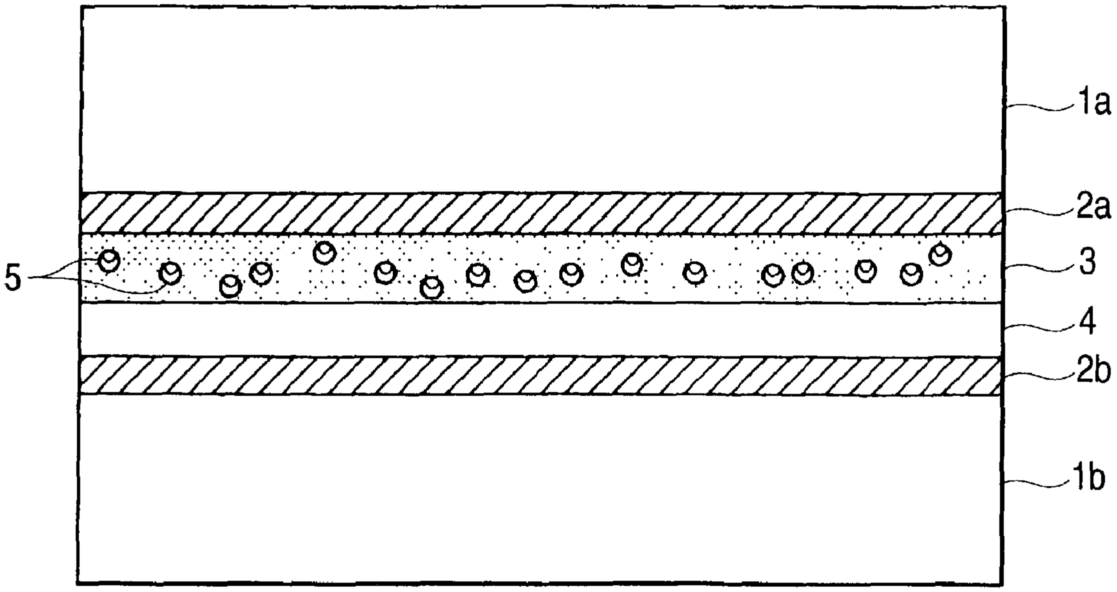
FIG. 3 is a drawing to show a second configuration example of the image record medium used with the image record apparatus of the first embodiment of the invention.

FIG. 3 is a drawing to show a second configuration example of the image record medium used with the image record apparatus of the first embodiment of the invention.

The image record medium shown in FIG. 3 comprises a liquid crystal layer 3 comprising a cholesteric liquid crystal droplet-dispersed in a polymeric support porous structure and having microcapsules 5 formed around the liquid crystal by forming a PDLC structure in place of spacer as compared with the first configuration example of the image record medium. The cholesteric liquid crystal is put into microcapsules, whereby the image memory property and the machine resistance characteristic of the image record medium are enhanced. Further, the liquid crystal with the capsules 5 dispersed therein is characterized by the fact that light is reflected on the liquid crystal in the capsules 5 and the liquid crystal is visible in opaque white in a state in which no electric field is applied between two transparent substrates and that the liquid crystal and the liquid crystal in the capsules 5 become transparent in a state in which an electric field is applied.

As shown in FIG. 3, the image record medium comprises a top transparent film (PET) substrate 1*a*, an electrode 2*a* provided by patterning ITO on the substrate 1*a*, a liquid crystal layer 3 provided by uniformly applying a solution in which capsules in which cholesteric liquid crystal is sealed in polymer are dispersed onto the electrode 2*a*, a photoconductive layer 4, a bottom transparent film (PET) substrate 1*b*, and an electrode 2*b* provided by patterning ITO on the substrate 1*b*.

A solution in which capsules 5 in which cholesteric liquid crystal is sealed in polymer are dispersed is uniformly applied onto the ITO electrode 2*a* of the transparent film (PET) substrate (125 μm thick) 1*a* with a functional thin-film print unit or an applicator. The application film thickness of the cholesteric liquid crystal solution is such that the cholesteric liquid crystal film thickness, when the solvent is evaporated, becomes the same degree as or more than the diameter of the capsule. As the solvent for dissolving the liquid crystal (cholesteric liquid crystal), a general solvent such as aromatic family, aliphatic family, alcohol family can be used.

The cholesteric liquid crystal application area is made smaller than the overlap area of a pair of transparent substrates.

In the configuration example, the cholesteric liquid crystal is applied with a functional thin-film print unit or an applicator, but the method need not be limited to this. For example, a method of using a print plate like screen print or a method of moving the application area with a dispenser or a spray coater may be used.

After the cholesteric liquid crystal is applied, the transparent substrate is heated or is left standing at room temperature to evaporate the solvent. As the heating method, for example, a method of using a hot plate and placing the transparent substrate onto which the cholesteric liquid crystal is applied on the hot plate, a method of blowing warm air, a method of applying infrared rays or microwave, a method of pressing a heating metal roll such as a heating stainless roll against the opposite side to the cholesteric liquid crystal application face of the cholesteric liquid crystal application substrate 1*a* to heat, or the like can be named.

In the configuration example, the top transparent substrate 1*a* onto which the cholesteric liquid crystal is applied is left standing at room temperature for one day, thereby evaporating the solvent and forming the liquid crystal layer 3.

Next, a substrate laminator is used to laminate the bottom transparent substrate 1*b* (PET, 125 μm thick) with the bottom transparent electrode 2*b* on the cholesteric liquid crystal application face of the top transparent substrate 1*a* so that the electrode face comes in contact with the cholesteric liquid crystal.

As one laminating method, the top transparent substrate 1*a* onto which the cholesteric liquid crystal is applied and the bottom transparent substrate 1*b* onto which the photoconductive layer 4 is applied are put on each other and allowed to pass through between two rollers containing a heater.

As another laminating method, the top transparent substrate 1*a* onto which the cholesteric liquid crystal is applied is fixed to a flat stage containing a heater from the back of the transparent electrode 2*a*.

The bottom transparent substrate 1*b* is positioned so that the inner face of the transparent electrode 2*a* of the top transparent substrate 1*a* fixed to the flat stage and the inner face of the transparent electrode 2*b* of the bottom transparent substrate 1*b* are opposed to each other, and is attracted and fixed to a pasting head containing a heater from the back of the transparent electrode 2*b* face.

The substrate laminator laminates the transparent substrates in sequence by positioning so that the transparent electrode 2*b* of the bottom transparent substrate 1*b* attracted and fixed to the pasting head is opposed to the cholesteric liquid crystal application face and moving a pasting roller containing a heater from an end part.

More specifically, the heater contained in the flat stage for fixing the top transparent substrate 1*a* onto which the cholesteric liquid crystal is applied, the heater contained in the pasting head for fixing the bottom transparent substrate 1*b*, and the heater contained in the pasting roller when a pair of transparent substrates is laminated on each other are set to the same temperature considering the thermal expansion of the transparent substrates.

When a pair of transparent substrates is laminated on each other, all contained heaters are set to 110° C. to prevent minute air bubbles from being contained in the liquid crystal layer 3 sandwiched between the transparent substrates 1*a* and 1*b*.

According to the method, for example, as for flexible substrates, a pair of plastic film substrates is heated to the same temperature and thus a problem of curling the end part of the plastic film substrate and breaking the transparent electrode is not involved.

In the configuration example, the method of applying the cholesteric liquid crystal to the transparent substrate is shown; to form a photoconductor or a light shield film between the transparent electrode of the transparent substrate and the cholesteric liquid crystal above the transparent electrode of the other transparent substrate, a method similar to the application method can also be executed.

Next, the image record medium of a first embodiment used with the image record apparatus of the first embodiment of the invention will be discussed.

Figure 4:
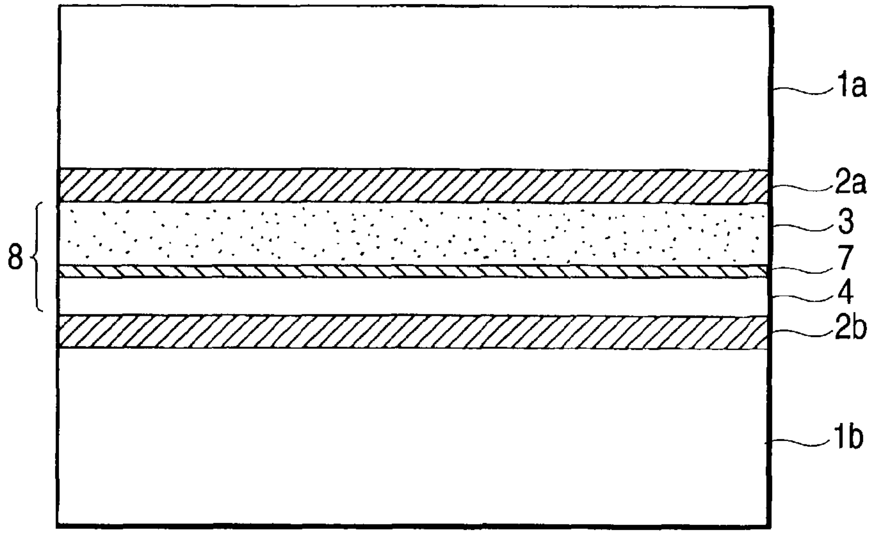
FIG. 4 is a drawing to show a first embodiment of the image record medium used with the image record apparatus of the first embodiment of the invention.

FIG. 4 is a drawing to show the image record medium of the first embodiment used with the image record apparatus of the first embodiment of the invention.

The image record medium of the first embodiment differs from the first configuration example of the image record medium previously described with reference to FIG. 2 in that a functional layer 7 for transmitting exposure light and shielding the scene is formed between a liquid crystal layer 3 and a photoconductive layer 4 of an image record layer 8 for recording a visible image.

In FIG. 4, transparent substrates 1*a* and 1*b* are formed with electrodes 2*a* and 2*b*, respectively and the image record layer 8 for recording a visible image is formed between the electrodes. The image record layer 8 comprises the photoconductor layer 4 indicating the electric characteristic distribution responsive to the light amount distribution of exposure light upon application of exposure light, the liquid crystal layer 3 to which the divided voltage distributed in response to the electric characteristic distribution of the photoconductor layer 4 is applied to record a visible image based on the optical characteristic distribution (intensity distribution of the exposure light) in response to the divided voltage, and the functional layer 7 formed at a position sandwiched between the photoconductive layer 4 and the liquid crystal layer 3 for transmitting exposure light when the exposure light is applied to the image record layer 8 and shielding the scene when the visible image recorded on the liquid crystal layer 3 is observed.

The image record apparatus of the first embodiment of the invention applies exposure light to a plurality of image record media stacked on each other, thereby recording a visible image on each image record medium. Therefore, the image record medium needs to have the functional layer 7 for transmitting a part of exposure light and shielding the scene when the visible image is observed. The optical requirement for the functional layer 7 for shielding the scene varies depending on which optical change the image record layer 8 uses. For example, if the image record layer 8 uses absorption factor change, white scattering property is required; if the image record layer 8 uses reflectivity change, light absorption property is required; or if the image record layer 8 uses scattering coefficient change, mirror reflection property is required. Thus, proper selection needs to be made in response to the image record layer 8. The functional layer 7 can also comprise a light absorption material and a light reflection material laminated on each other as required.

As the functional layer 7, for example, a layer of black polyimide BKR-105 (manufactured by Nippon Kayaku Co., Ltd.) formed 0.7 μm thick by a spin coat method, a layer of CK7800L (manufactured by Dainippon Ink & Chemicals) formed 1.2 μM thick with a spin coater, a layer formed 2 μm thick by dip coating a water solution of black paint PC-Black-006P (manufactured by Nippon Kayaku Co., Ltd.) and polyvinyl alcohol, a black PET resin film 4 μm thick or the like can be used. Any of them can be used to form the functional layer 7 scarcely transmitting visible light.

As a material used for the liquid crystal layer 3 having electric responsivity based on the partial pressure, for example, memory-property liquid crystal such as chiral nematic liquid crystal, smectic A liquid crystal, chiral smectic C liquid crystal, bistable twisted nematic liquid crystal, or fine particle dispersion liquid crystal or a memory-property display element such as a Gyricon element or an electric migration element can be used.

As a material of the photoconductor layer 4, a photoconductive material (1) or a photovoltaic material (2) is available. As the photoconductive material (1), (a) an inorganic semiconductor material such as amorphous silicon, ZnSe, or CdS or an organic semiconductor material such as anthracene or polyvinyl carbazole or (b) a composite material of a charge generation material for generating charges upon application of light, such as perylene family, phthalocyanine family, bis azo family, dithiopitokelopyrrole family, squarylium family, azulenium family, or thiapyrilium polycarbonate family compound, a charge transport material for transporting generated charges, such as trinitrofluorene family, polyvinyl carbazole family, oxadiazole family, pyrarizone family, hydrazone family, stilbene family, triphenyl amine family, triphenyl methane family, or diamine family compound, and an ion conductive material such as polyethylene oxide or polyvinyl alcohol to which $LiClO_4$ is added is used. As the photovoltaic material (2), a semiconductor having p-n junction (silicon, compound semiconductor, organic semiconductor), etc., can be used. Electric responsive material and photoelectric effect material can be used in various modes of a mixture, a laminate, a microcapsule, etc.

As optical material having electric responsivity described above, liquid crystal material produces optical change in a low electric field; as particularly preferred liquid crystal material, a known liquid crystal composition such as cyanobiphenyl family, phenylcyclohexyl family, phenyl benzoate family, cyclohexyl benzoate family, azo methine family, azo benzene family, pyrimidine family, dioxane family, cyclohexyl cyclohexane family, stilbene family, or tran family can be used. An additive of pigment, fine particles, etc., may be added to the liquid crystal material. Liquid crystal material dispersed in a polymeric matrix, put into polymeric gel, or put into capsule may be used. Any of polymeric liquid crystal, middle molecular liquid crystal, or low molecular liquid crystal may be used or a mixture thereof may be used.

Thus, function separation can provide the advantages that sensitivity to the exposure light amount can be enhanced, that write is made possible in a low electric field, and that material options are widened.

The substrates 1*a* and 1*b* and the electrodes 2*a* and 2*b* are identical with those previously described with reference to FIG. 2 in the first configuration example and therefore will not be again discussed.

Figure 5:
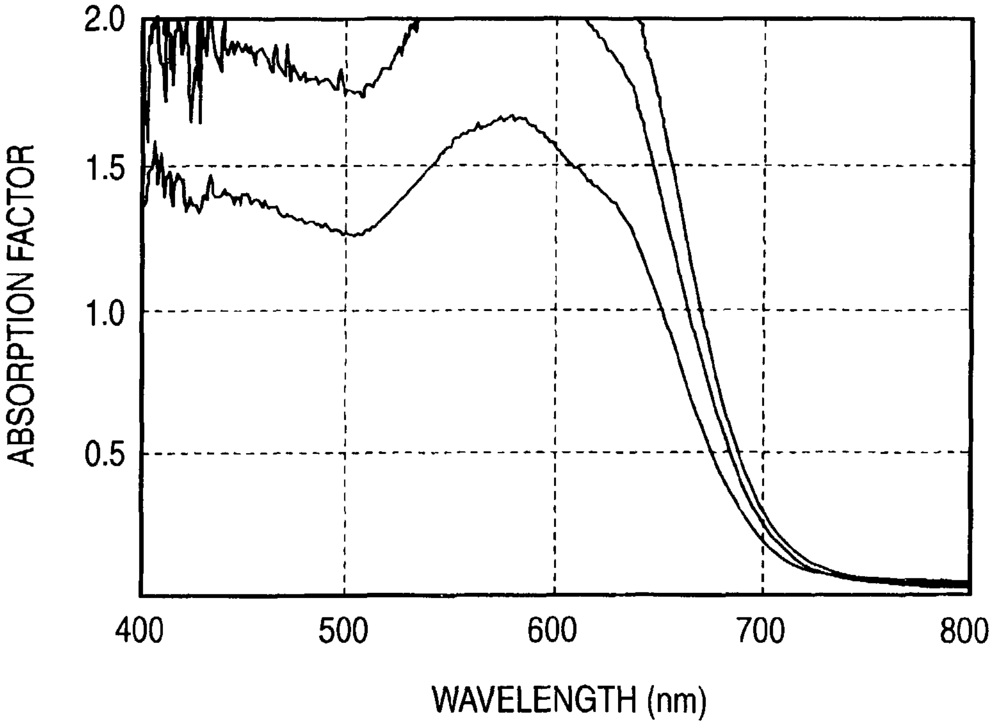
FIG. 5 is a graph to show the absorbance of a light shield layer of the first embodiment of the image record medium.

FIG. 5 is a graph to show the absorbance of the functional layer of the image record medium of the first embodiment.

In FIG. 5, the vertical axis represents the absorption factor, the horizontal axis represents the wavelength, and curves in the figure represent the wavelength characteristics of the absorption factors concerning various substances used for the functional layer previously described with reference to FIG. 4.

As seen in FIG. 5, light having wavelengths of 600 nm or less is absorbed and is scarcely transmitted, but infrared light having wavelengths of 700 nm or more is transmitted and is scarcely absorbed. Therefore, if the wavelength range in the neighborhood of 700 nm is used as exposure light, the substances shield light in the display wavelength range, but transmit the exposure light and therefore can be used as the functional layer 7 of the embodiment.

If the wavelength range of exposure light for representing an image lies in the visible wavelength range, lack of hiding occurs in the wavelength range and therefore it is desirable that the wavelength range of exposure light should be outside the visible wavelength range, namely, the wavelength range is not more than 400 nm or not less than 700 nm. Generally, the wavelength range of 400 nm to 800 nm is said to be visible wavelength range, but low visibility is provided in the wavelength range of 700 nm to 800 nm and thus the wavelength range of exposure light may lie in the above-mentioned range and more preferably the wavelength range of exposure light for representing an image can be placed in 800 nm or more. To set the wavelength range of exposure light for representing an image within the visible wavelength range, it is better to narrow the width of the wavelength range of exposure light for the purpose of suppressing the degree of lack of hiding and preferably the width of the wavelength range is set to 100 nm or less; more preferably 50 nm or less.

Preferably, the transmittance of the functional layer in the display wavelength range is 10% or less; more preferably 1% or less.

As a method of controlling the transmittance of the functional layer by wavelength range, a method of using wavelength dependency of the reflectivity or a method of using wavelength dependency of the absorption factor is available. The former method can be realized, for example, by using a dielectric multilayer film, a cholesteric liquid crystal having selective reflection, or the like as the functional layer and the latter method can be realized, for example, by a color material containing dye or pigment having an absorption spectrum or a phase difference plate sandwiched between two light polarizers as the functional layer.

Figure 6:
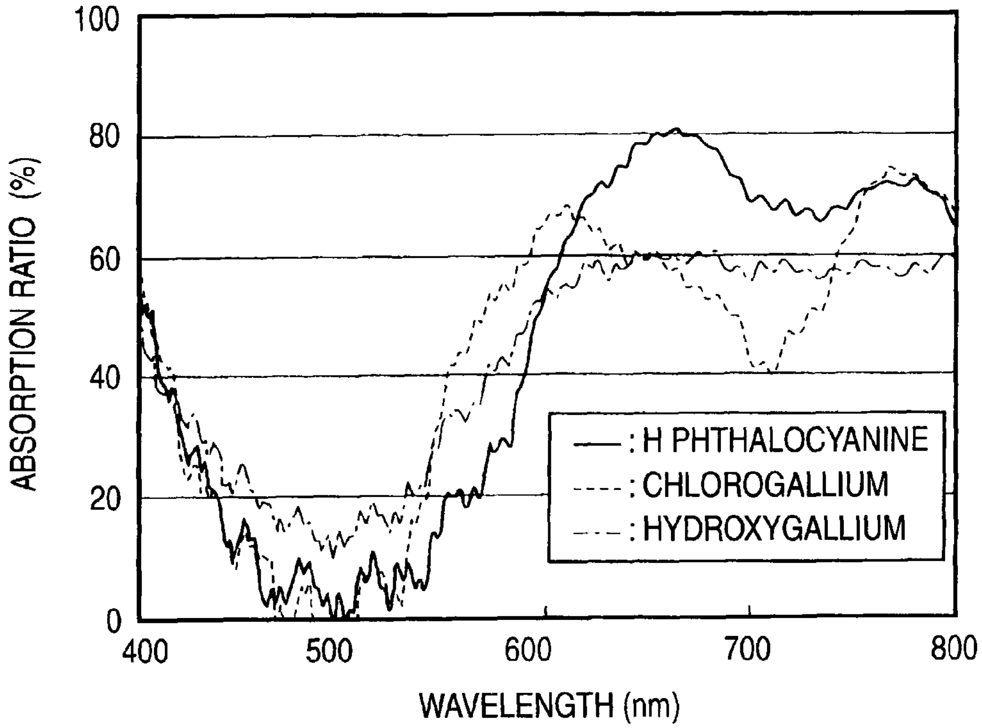
FIG. 6 is a drawing to show the absorption factor of the photoconductor layer of the first embodiment of the image record medium.

FIG. 6 is a drawing to show the absorption factor of the photoconductor layer of the image record medium of the first embodiment.

In FIG. 6, the vertical axis represents the absorption factor of light, the horizontal axis represents the wavelength, and the curves in the figure represent the wavelength characteristics of the absorption factors of light concerning various substances used for the photoconductor layer.

As seen in the figure, the photoconductor layer scarcely absorbs light in the vicinity of 500 nm, but absorbs light in the wavelength range of 700 nm or more and the resistance value changes.

Therefore, as seen FIGS. 5 and 6, to write image information onto the image record medium having the functional layer, if exposure light of a wavelength of 700 nm or more, it is made possible to write a visible image even with a plurality of image record media stacked on each other.

The functional layer 7 can be provided not only with a function of being made variable in transmittance upon application of external irritation and being placed in a transmission state for transmitting a part of exposure light upon application of external irritation only at the light exposure time, but also with a function of shielding the scene at the observing time.

Figure 7:
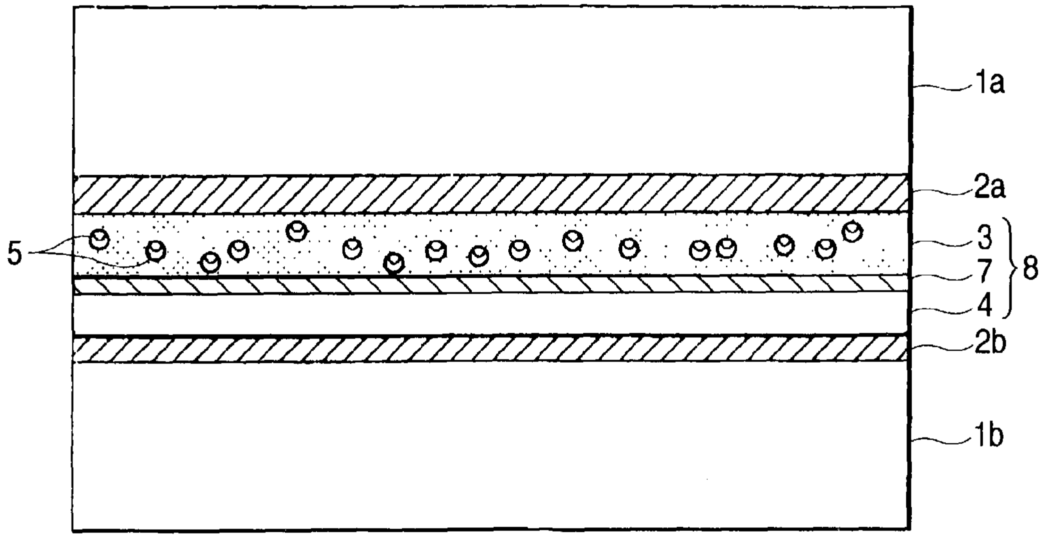
FIG. 7 is a drawing to show a second embodiment of the image record medium used with the image record apparatus of the first embodiment of the invention.

FIG. 7 is a drawing to show the image record medium of a second embodiment used with the image record apparatus of the first embodiment of the invention.

The image record medium of the second embodiment differs from the image record medium of the first embodiment previously described with reference to FIG. 4 only in liquid crystal layer 3 of image record layer 8. The liquid crystal layer 3 is identical with that in the second configuration example previously described with reference to FIG. 3. Therefore, components identical with those previously described with reference to FIGS. 3 and 4 are denoted by the same reference numerals in FIG. 7 and will not be discussed again.

In FIG. 7, a functional layer 7 is formed between a photoconductive layer 4 and the liquid crystal layer 3 of the image record layer 8. The liquid crystal layer 3 comprises a cholesteric liquid crystal droplet-dispersed in a polymeric support porous structure and has microcapsules 5 formed around the liquid crystal by forming a PDLC structure in place of spacer.

As shown in FIGS. 4 and 7, in case that the functional layer 7 is sandwiched between the liquid crystal layer 3 and the photoconductive layer 4, when an image is written from the back side where the photoconductive layer 4 exists, light applied from the surface side where the liquid crystal layer 3 exists to the photoconductive layer 4 is shielded on the functional layer 7, so that the image write performance onto the image record medium is enhanced. To observe an image, the scene is not seen through the image record medium, so that a visible image can be seen clearly.

Figure 8:
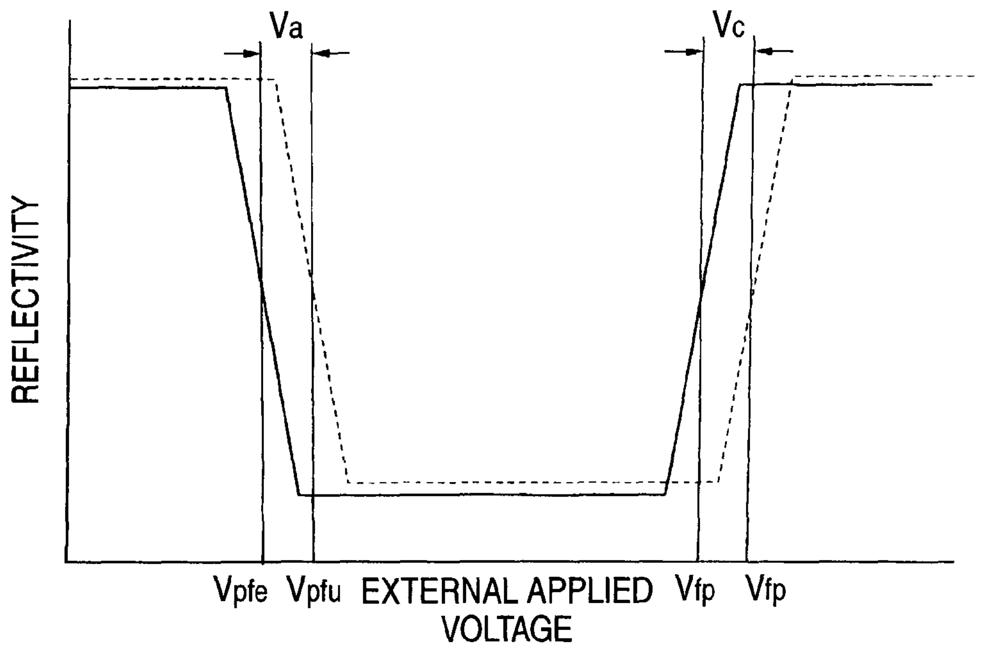
FIG. 8 is a schematic drawing to show a switching behavior of the image record medium connected to the image record apparatus of the embodiment of the invention.

FIG. 8 is a schematic drawing to show a switching behavior of the image record medium connected to the image record apparatus of the embodiment.

In FIG. 8, the vertical axis represents the reflectivity of the liquid crystal layer and the horizontal axis represents the voltage applied between the electrodes of the image record medium. The solid line in the figure represents the behavior of the liquid crystal layer at the light exposure time and the dotted line represents the behavior of the liquid crystal layer at the light non-exposure time. The threshold voltage at which the liquid crystal layer 3 makes a transition from a planer phase to a focal conic phase at the light exposure time is Vpfe, the threshold voltage at which the liquid crystal layer 3 makes a transition from the planer phase to the focal conic phase at the light non-exposure time is Vpfu, the threshold voltage at which the liquid crystal layer 3 makes a transition from the focal conic phase to the planer phase at the light exposure time is Vfpe, and the threshold voltage at which the liquid crystal layer 3 makes a transition from the focal conic phase to the planer phase at the light non-exposure time is Vfpu.

As seen in FIG. 8, if the applied voltage is set in the range of Va from Vpfe to Vpfu, the image record medium becomes the planer phase at the light non-exposure time and shows a black state at high reflectivity; the image record medium makes the transition to the focal conic phase at the light exposure time and thus shows a transparent state at low reflectivity. If the applied voltage is set in the range of Vc from Vfpe to Vfpu, the image record medium becomes the focal conic phase at the light non-exposure time and shows a transparent state at low reflectivity; the image record medium makes the transition to the planer phase at the light exposure time and thus shows a black state at high reflectivity.

Figure 9:
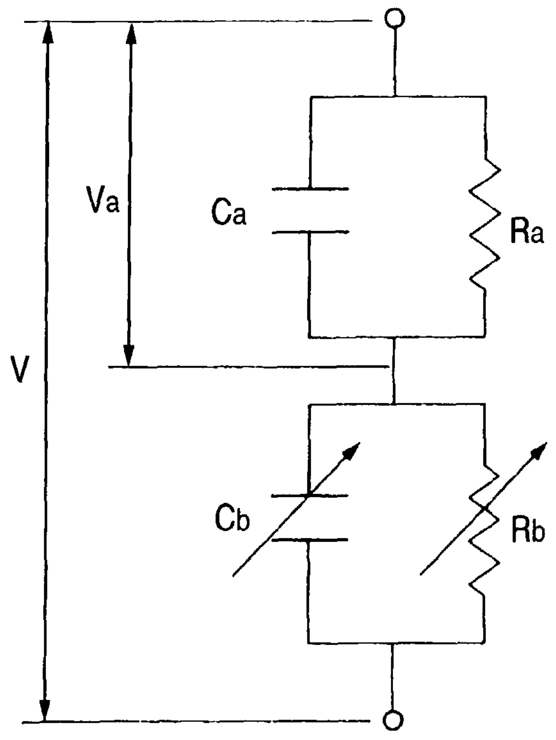
FIG. 9 shows an equivalent circuit of the image record medium of the embodiment.

FIG. 9 shows an equivalent circuit of the image record medium of the embodiment.

In FIG. 9, Ca denotes the capacitance of the liquid crystal layer 3, Cb denotes the capacitance of the photoconductor layer 4, Ra denotes the resistance value of the liquid crystal layer 3, and Rb denotes the resistance value of the photoconductor layer 4. When voltage V is applied between the electrodes 2*a* and 2*b* of the image record medium from the image record apparatus, the resistance value Ra of the liquid crystal layer 3 and the resistance value Rb of the photoconductor layer 4 generally are sufficiently large and thus voltage Va applied to the liquid crystal layer 3 becomes $$Va=(Cb/C)\times V$$

where C=CaCb/(Ca+Cb).

To use an organic photoconductor of charge-transfer complex type or eutectic complex type for the photoconductor layer 4, the applied film thickness is simply controlled, whereby a sufficient threshold voltage difference can be provided; to use an organic photoconductor of lamination type for the photoconductor layer 4, the film thickness of a charge transport layer is more simply controlled, whereby a sufficient threshold voltage difference can be provided.

On the other hand, the switching behavior of the liquid crystal layer 3 can be controlled based on the dielectric constant anisotropy, the elastic coefficient, and the helical pitch of the cholesteric liquid crystal forming the liquid crystal layer 3, the skeleton and the side chain of high polymer, phase separation process, the morphology of the interface between high polymer and liquid crystal, the degree of the anchor ring effect on the interface between high polymer and liquid crystal determined by the total thereof, etc. Specifically, the type and composition ratio of nematic liquid crystal, the type of chiral agent, the type and composition ratio of monomer, oligomer, initiator, crosslinking agent, etc., of the starting substance of polymeric resin, polymerization temperature, exposure light source, light exposure intensity, light exposure time, and ambient temperature for photo polymerization, electron strength, exposure time, and ambient temperature for electron polymerization, the type and the composition of solvent at the applying time, solvent concentration, wet film thickness, dry temperature, starting temperature at the temperature falling time, temperature falling speed, and the like are included, but the invention is not necessarily limited to them.

Next, the function of the voltage application section and the light application section of the image record apparatus using such characteristics of the image record medium will be discussed.

Figure 10:
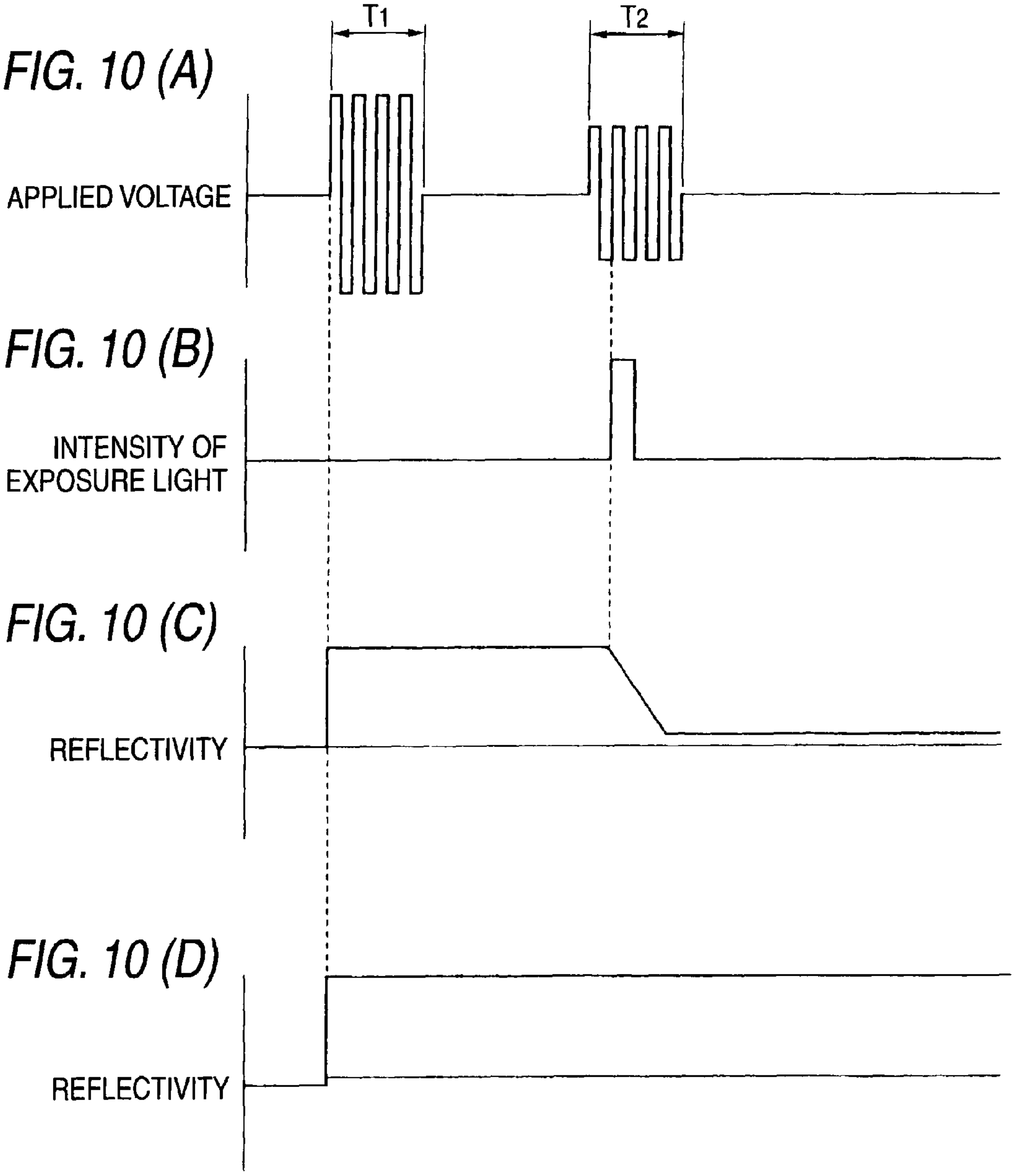
FIG. 10 is a drawing to show an example of a function of a voltage application section and a light application section and optical characteristic change of the image record medium.

FIG. 10 is a drawing to show an example of the function of the voltage application section and the light application section and optical characteristic change of the image record medium.

FIG. 10(A) shows the voltage applied from the voltage application section to the image record medium, FIG. 10(B) shows the intensity of exposure light (having a wavelength range of 700 μm or more) applied from the light application section to the image record medium, FIG. 10(C) shows the reflectivity of a portion of the image record medium to which the exposure light is applied, and FIG. 10(D) shows the reflectivity of a portion of the image record medium to which the exposure light is not applied. The horizontal axis of each FIG. 10 represents the progression of time.

To begin with, as the first step, an AC pulse voltage of Vfpu or more shown in FIG. 8 is applied for T1 time and the image record medium is reset (FIG. 10(A)). Accordingly, the liquid crystal layer 3 of the image record medium becomes the planer phase, so that the reflectivity of the liquid crystal layer 3 uniformly rises (FIGS. 10(C) and 10(D)). Although applying the voltage is stopped after the expiration of the AC pulse voltage applying time T1, the liquid crystal layer 3 is held in the high reflectivity because the planer phase has a memory property.

Next, as a second step, a voltage in the range of Vpfe to Vpfu shown in FIG. 8 is applied for T2 time (FIG. 10(A)). However, the planer phase is held until exposure light is applied (B), and selective reflection is shown (FIG. 10(C) and (D)).

After this, when light exposure is started (FIG. 10(B)), in a portion to which the exposure light is applied, the voltage distributed to the liquid crystal layer 3 is increased and thus the liquid crystal layer 3 makes the transition from the planer phase to the focal conic phase and the reflectivity is lowered. Then, if the light exposure terminates (FIG. 10(C)), the liquid crystal layer 3 is held in the low reflectivity because the focal conic phase has a memory property. On the other hand, in a portion of the image record medium to which the exposure light is not applied, the planer phase is held and thus the high reflectivity state is held and selective reflection is continued (FIG. 10(D)).

Figure 11:
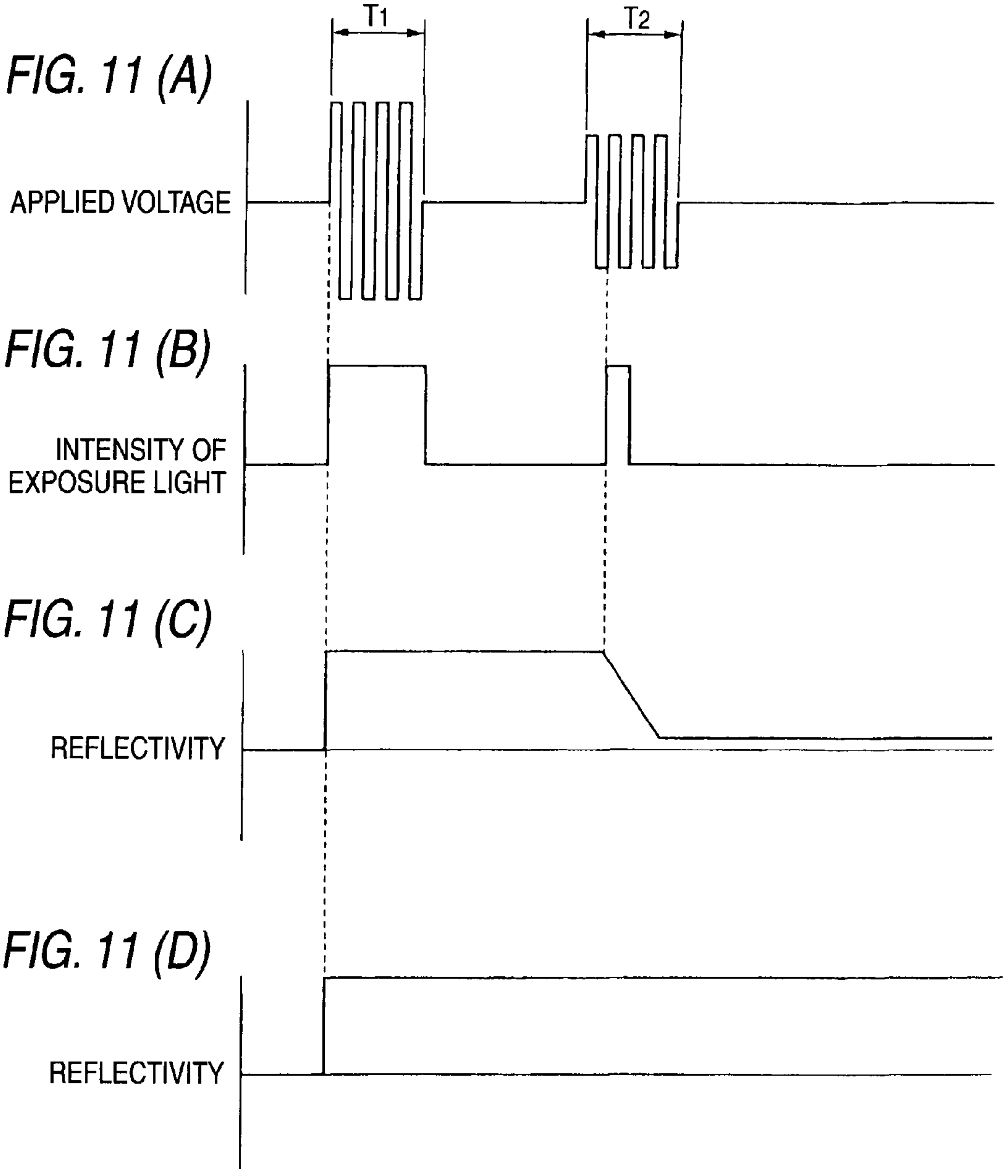
FIG. 11 is a drawing to show another example of the function of the voltage application section and the light application section and optical characteristic change of the image record medium.

FIG. 11 is a drawing to show another example of a function of the voltage application section and the light application section and optical characteristic change of the image record medium.

FIG. 11(A) shows the voltage applied from the voltage application section to the image record medium, FIG. 11(B) shows the intensity of exposure light (having a wavelength range of 700 μm or more) applied from the light application section to the image record medium, FIG. 11(C) shows the reflectivity of the portion of the image record medium to which the exposure light is applied, and FIG. 11(D) shows the reflectivity of the portion of the image record medium to which the exposure light is not applied. The horizontal axis of each FIG. 11 represents the progression of time.

To begin with, as a first step, while a voltage in a range of Vfpe to Vfpu shown in FIG. 8 is applied for T1 time (FIG. 11(A)), the whole photoconductor layer 4 is exposed to light (FIG. 11(B)), thereby resetting the image record medium. Accordingly, the liquid crystal layer 3 of the image record medium becomes the planer phase, so that the reflectivity of the liquid crystal layer 3 uniformly rises (FIGS. 11(C) and 11(D)). Although applying the voltage and applying the exposure light are stopped after the expiration of the AC pulse voltage applying time T1, the liquid crystal layer 3 is held in the high reflectivity because the planer phase has a memory property.

Next, as the second step, a voltage in the range of Vpfe to Vpfu shown in FIG. 8 is applied. However, the planer phase is held until light exposure is started, and selective reflection is shown.

After this, when light exposure is started (FIG. 11(B)), in a portion to which the exposure light is applied, the voltage distributed to the liquid crystal layer 3 is increased and thus the liquid crystal layer 3 changes from the planer phase to the focal conic phase and the reflectivity is lowered. Then, if the light exposure terminates (FIG. 11(B)), the liquid crystal layer 3 is held in the low reflectivity because the focal conic phase has a memory property (FIG. 11(C)). On the other hand, in a portion of the image record medium to which the exposure light is not applied, the planer phase is held and thus the high reflectivity state is held and selective reflection is continued (FIG. 11(D)).

Thus, the voltage application section of the image record apparatus needs to supply different voltages at the first and second steps.

In both the function examples previously described with reference to FIGS. 10 and 11, the voltage is applied before exposure light is applied, but the voltage need not necessarily be applied before exposure light is applied, and the voltage may be applied after exposure light is applied.

A result of placing two image record media in the image record apparatus and actually writing images will be discussed.

To begin with, a rectangular wave is given at 50 Hz for 300 ms without exposing the photoconductor layer 4 of the image record medium and then the voltage is turned off. Then, when the amplitude of the rectangular wave is in a range of 80 V to 140 V, the image record medium is seen to be transparent and when the amplitude of the rectangular wave is 160 V or more, the image record medium shows a white color.

On the other hand, while the photoconductor layer 4 of the image record medium is exposed, a rectangular wave is given at 50 Hz for 300 ms and then the voltage is turned off. Then, when the amplitude of the rectangular wave is in a range of 75 V to 120 V, the image record medium is seen to be transparent and when the amplitude of the rectangular wave is 130 V or more, the image record medium shows a white color.

Figure 12:
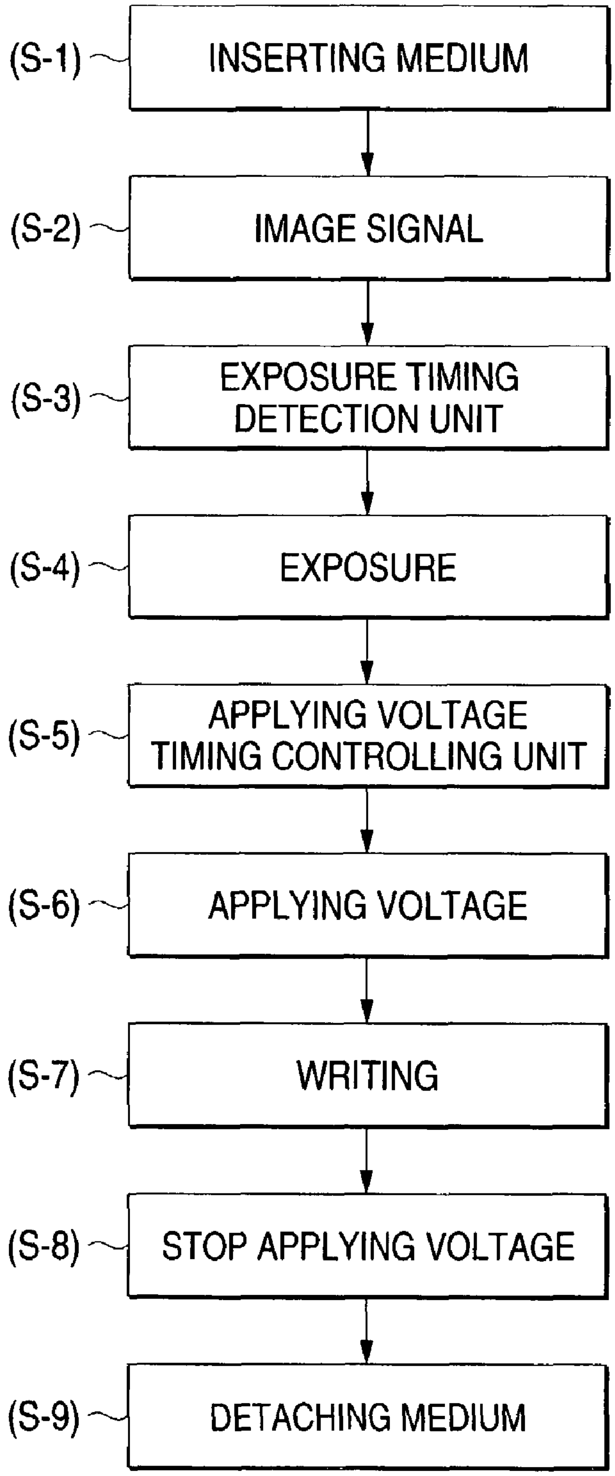
FIG. 12 is a flowchart to show a function of a control section of the image record apparatus of the first embodiment of the invention.

FIG. 12 is a flowchart to show a function of the control section 40 of the image record apparatus of the first embodiment of the invention.

In the embodiment, the control section 40 records the same visible image simultaneously on a plurality of image record media 14 stacked on each other and inserted into the image record medium holder 10 based on exposure light applied from the light application section 34.

Here, as the image record media, preferably those of the first and second embodiments of the invention previously described with reference to FIGS. 4 and 7 are used; however, the image record media of the first and second configuration examples previously described with reference to FIGS. 2 and 3 may be used and further any image record medium may be used if it allows a visible image to be recorded thereon upon reception of irritation of both exposure light applying and voltage applying.

As shown in FIG. 12, the connector 12 is attached to each of a plurality of image record media 14 and the image record media 14 are inserted into the image record medium holder 10. The image record medium holder 10 into which the image record media 14 are inserted is connected to the voltage application section 20 of the record apparatus (S-1). Upon completion of preparation for writing an image, an image signal for causing the pattern generation section 35 to display image information is generated or selected (S-2). The light exposure timing is detected based on the image signal for causing the pattern generation section 35 to display image information (S-3) and when the timing comes, exposure light is applied from the light application section 34 (S-4). The timing at which an image write voltage is applied is also detected based on the image signal for causing the pattern generation section 35 to display image information (S-5). When the timing comes, a predetermined threshold voltage is applied by the voltage application section 20 to any desired number of image record media 14 of those inserted into the image record medium holder 10 for a predetermined time (S-6) to record any desired image on the plurality of image record media 14 at the same time (S-7). After the expiration of the predetermined time, applying the voltage is stopped (S-8) and the image record media 14 on which the image is recorded are removed or the image record medium holder 10 into which the image record media 14 are inserted is removed from the image record apparatus.

Thus, when the voltage is simultaneously applied to each of electrode pairs of the plurality of image record media 14 attached and exposure light is applied thereto, the same image information is recorded on the plurality of image record media 14.

In this case, preferably the image record medium 14 away from the light application section 34 has the photoconductor layer 4 having better sensitivity than that of the photoconductor layer 4 of the image record medium 14 close to the light application section 34. Before exposure light is applied, each image record medium 14 may be reset to the initial orientation state.

Figure 13:
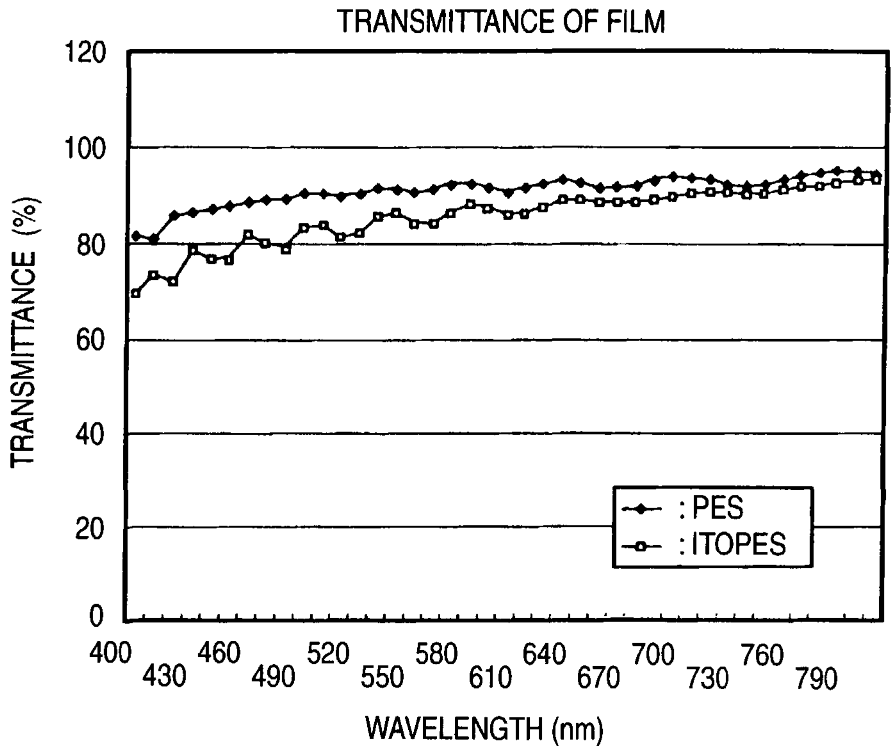
FIG. 13 is a drawing to show the light transmittance of a transparent substrate (PES) and that of ITO (ITOPES) on the transparent substrate.
Figure 14:
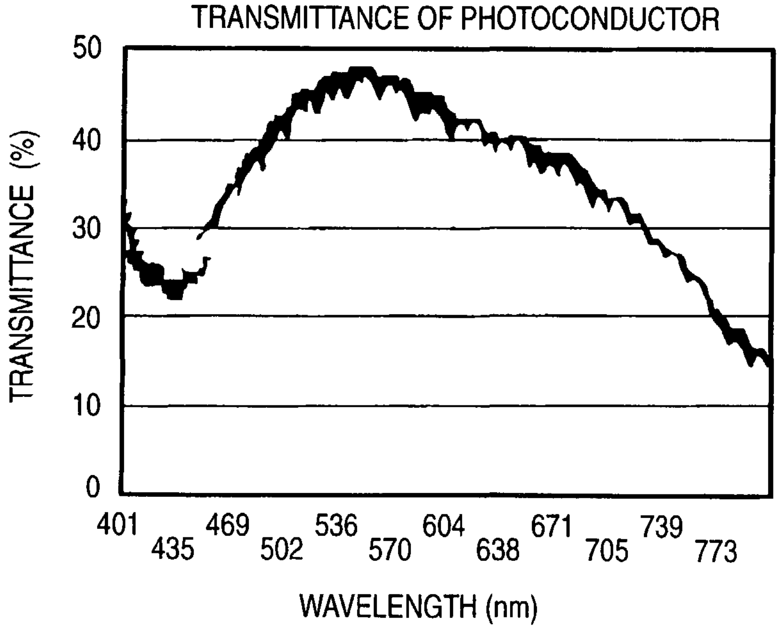
FIG. 14 is a drawing to show the light transmittance of a photoconductor layer.

FIG. 13 is a drawing to show the light transmittance of the transparent substrate (PES) and that of the ITO (ITOPES) on the transparent substrate and FIG. 14 is a drawing to show the light transmittance of the photoconductor layer.

In FIGS. 13 and 14, each vertical axis represents the light transmittance and each horizontal axis represents the wavelength.

Since the amount of light arriving at the liquid crystal layer of the image record medium results from multiplying the light transmittance of the transparent substrate shown in FIG. 13 by that of the ITO on the transparent substrate shown in FIG. 13 by the light transmittance of the photoconductor layer shown in FIG. 14, preferably the image record medium placed at a position away from the light application section of the image record apparatus has the photoconductor having better sensitivity than that of the photoconductor of the image record medium placed at a position close to the light application section.

Figure 15:
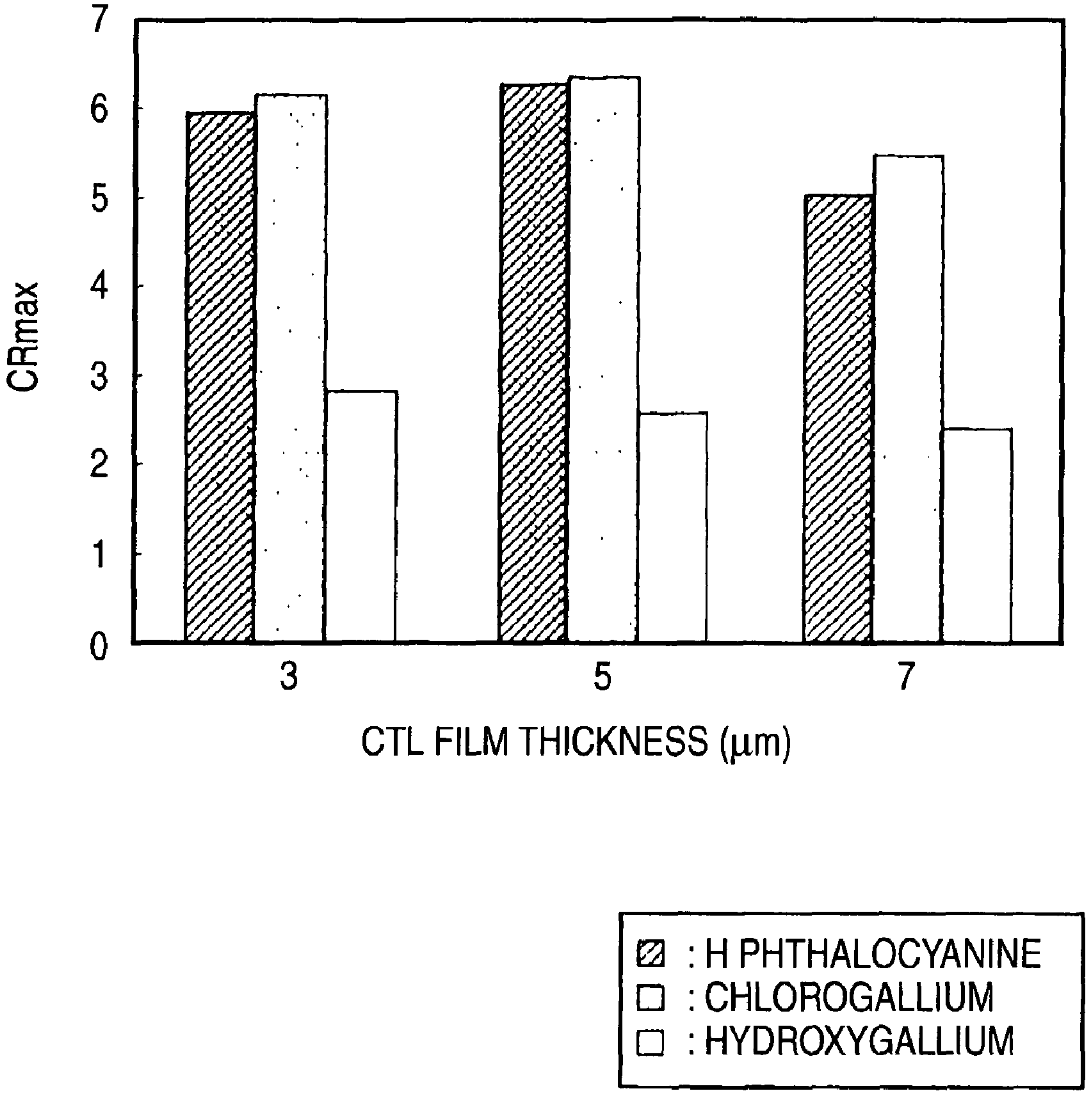
FIG. 15 is a drawing to show the sensitivity of the photoconductor layer when materials and film thicknesses are changed.

FIG. 15 is a drawing to show the sensitivity of the photoconductor layer when materials and film thicknesses are changed.

In FIG. 15, the vertical axis represents CRmax (CRmax means the best value in contrast), the horizontal axis represents the film thickness, and the bar graph in the figure indicates the types of materials.

As seen in the figure, any desired sensitivity can be set by changing the material and the film thickness. Therefore, as the embodiment of the image record method of the invention, image record media different in material and film thickness are prepared, whereby a plurality of image record media different in required amount of exposure light can be provided. The image record media different in required amount of exposure light are previously classified according to the distance from the light application section and can be stacked on each other and inserted into the image record medium holder.

Next, an image record apparatus of a second embodiment of the invention will be discussed.

The embodiment corresponds to the image record apparatus of the second embodiment of the invention, an image record method of an embodiment of the invention, and an image record medium holder of an embodiment of the invention.

The image record apparatus of the embodiment differs from the image record apparatus of the first embodiment only in that change is made to exposure light for representing a different image in sequence and while the exposure light is applied, voltage is applied to the image record medium for recording the different image, so that different images are recorded on different image record media in sequence. Therefore, only the function of a control section of the image record apparatus, which is the difference from the image record apparatus of the first embodiment, will be discussed.

Figure 16:
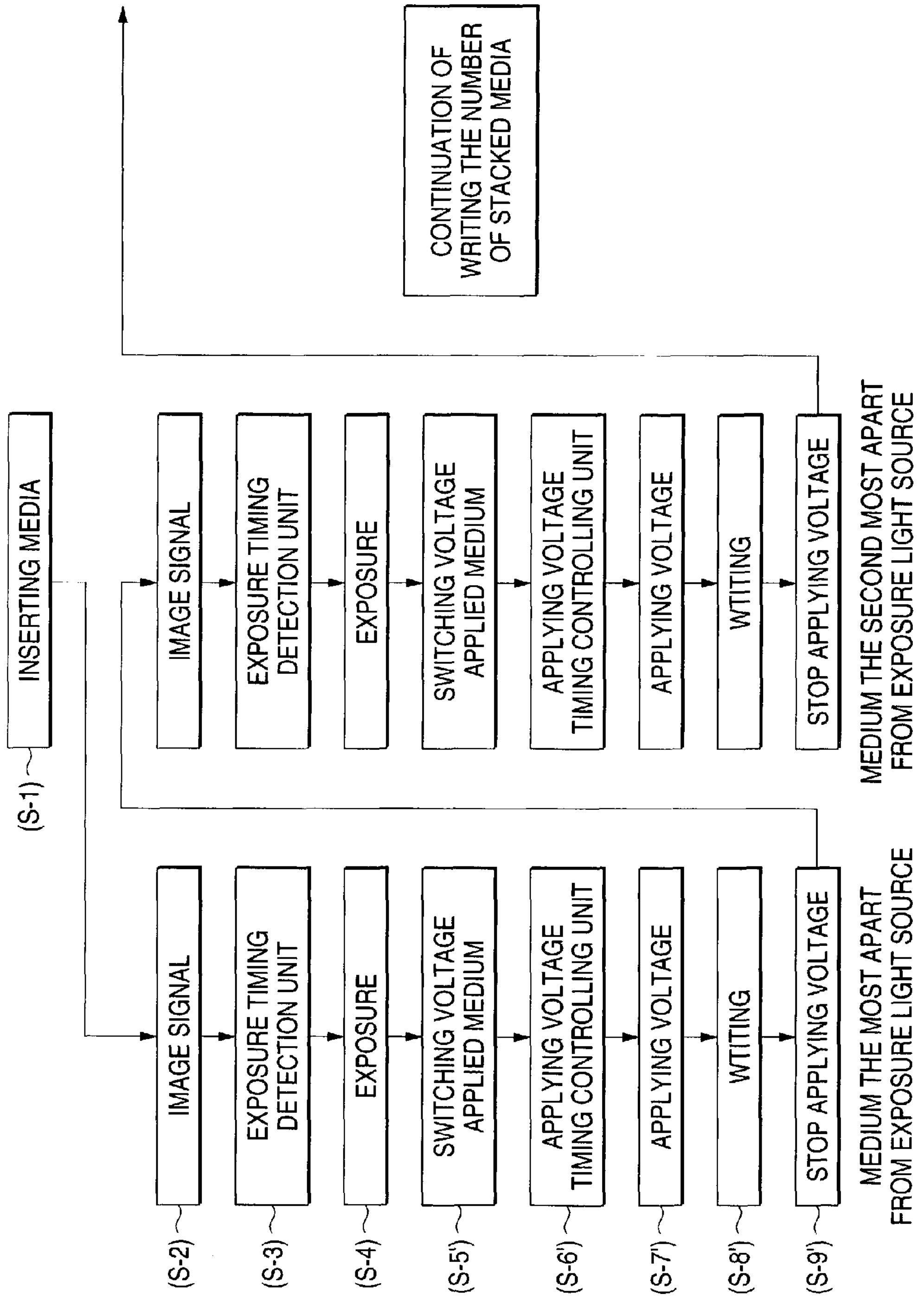
FIG. 16 is a flowchart to show a function of a control section of an image record apparatus of a second embodiment of the invention.
Figure 17:
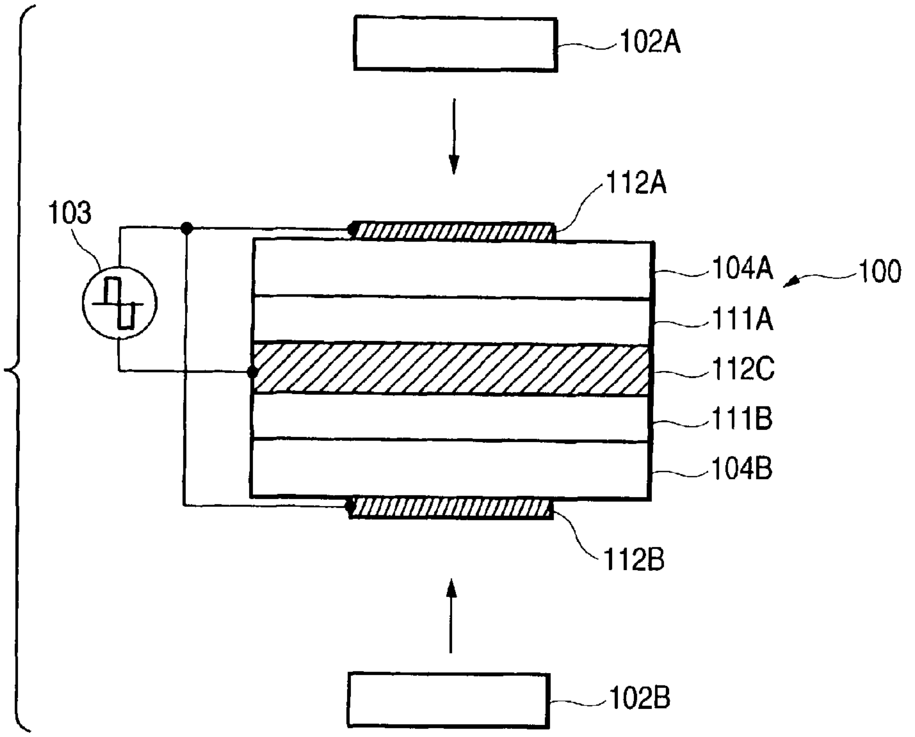
FIG. 17 is a drawing to show a double-sided image record apparatus disclosed in JP-A-5-165002.

FIG. 16 is a flowchart to show a function of the control section of the image record apparatus of the second embodiment of the invention.

In the embodiment, different images are recorded on the image record media inserted into an image record medium holder, respectively. Therefore, as the function of the control section, the flow of the image record process in the first embodiment previously described with reference to FIG. 12 is repeated every image record media one by one as many times as the number of the image record media on which different images are to be recorded.

Here, as the image record media, preferably those of the first and second embodiments of the invention previously described with reference to FIGS. 4 and 7 are used; however, the image record media of the first and second configuration examples previously described with reference to FIGS. 2 and 3 may be used and further any image record medium may be used if it allows a visible image to be recorded thereon upon reception of irritation of both exposure light applying and voltage applying.

In FIG. 16, a connector 12 is attached to each of a plurality of image record media and the image record media are inserted into the image record medium holder. The image record medium holder into which the image record media are inserted is connected to a voltage application section of the record apparatus (S-1). Upon completion of preparation for writing an image, an image signal for causing a pattern generation section to display image information is generated or selected (S-2). Then, steps to exposure to light (S-3 and S-4) are executed according to a similar procedure to that in the flow in the first embodiment.

Next, in the embodiment, since different images need to be written onto a plurality of image record media, an external connection terminal in a medium connection section 11 of the image record medium holder is switched for each image record medium to which a write voltage is applied (S-5'). The timing at which an image write voltage is applied to the target image record medium is detected based on the image signal for causing the pattern generation section to display image information (S-6'). Then, any desired image is recorded according to a similar procedure to that in the flow in the first embodiment (S-7 and S-8'). After the expiration of a predetermined time, applying the voltage is stopped (S-9'). Upon completion of writing the image onto a first image record medium, then a different image is written onto a second image record medium. The procedure of writing the image onto the second or later image record media is the same as that onto the first image record medium and therefore will not be discussed again.

Preferably, as the order of writing onto the image record media in the embodiment, applying the write voltage is started at the image record medium most away from the light application section and the image record medium is switched to the image record medium close thereto and the write voltage is applied to the image record medium in order. Before exposure light is applied, each image record medium may be reset to the initial orientation state.

Thus, once a plurality of image record media are attached to the image record apparatus, different pieces of image information can be consecutively recorded on the image record media.

Figure 18:
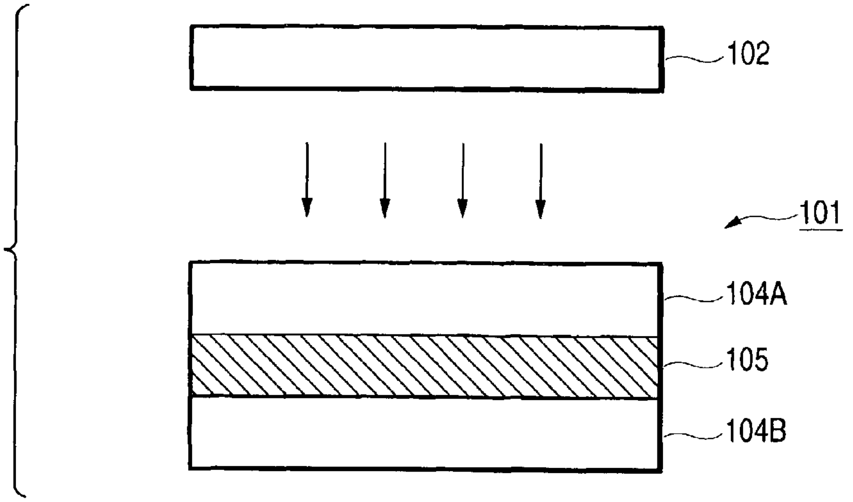
FIG. 18 is a drawing to show an image record medium of a third embodiment of the invention.

FIG. 18 is a drawing to show an image record medium 101 of a third embodiment of the invention.

The image record medium 101 shown in FIG. 18 comprises two layers of image record layers 104A and 104B each on which a visible image is recorded upon application of exposure light for representing an image and a functional layer 105 formed at a position sandwiched between the two image record layers 104A and 104B for transmitting exposure light when the exposure light is applied and shielding the scene when the visible image recorded on the image record layer 104A, 104B is observed.

To record a visible image on the two image record layers of the image record medium 101, one light exposure unit 102 is used to apply exposure light to the image record layers 104A and 104B from either front or rear surface of the image record medium 101. When exposure light is applied to the image record layers 104A and 104B from the light exposure unit 102, the image record layers 104A and 104B produce optical change in absorption factor, reflectivity, scattering coefficient, etc., and the optical change is maintained still after the exposure light is applied. A material may also be used that can produce optical change upon application of a minute amount of exposure light by adding external irritation of electricity, magnetism, heat, electromagnetic wave, light different in wavelength from the exposure light, or the like at the same time in addition to applying the exposure light.

As the light exposure unit 102, (1) a method of two-dimensionally scanning a light flux provided by narrowing down a laser beam, etc., with a deflection device such as a polygon mirror or a galvanomirror, (2) a method of scanning an optical image generated by a one-dimensional array of light emitting diodes (LEDs), vacuum fluorescent elements, electroluminescent (EL) elements, LCD, etc., (3) a method of scanning an optical image generated by a two-dimensional array of cathode ray tube (CRT), plasma display, EL display, field emission display, liquid crystal display (LCD), digital mirror display (DMD), etc., or the like can be used. The LCD or DMD, which is a light non-emission type device, is used in combination with a light source such as a laser, LED, an incandescent lamp, a fluorescent lamp, a discharge lamp, or an EL lamp. As a projection method, an array may be brought into contact with the image record medium 101 for exposing light thereto in addition to projecting through an image forming lens.

In the image record medium 101 of the embodiment, to record a visible image on the image record layer 104B upon application of exposure light through the image record layer 104A, the image record layer 104A needs to transmit a part of the exposure light and has transmittance of preferably at least 10% or more, more preferably 30% or more. The image record layers 104A and 104B will be discussed later in detail.

As the functional layer 105, a material or a composite material for selectively transmitting exposure light for representing an image is used. The term "selectively" is used to mean preventing transmitting of light in a wavelength range in which optical change occurs in the image record layer 104A, 104B, which will be hereinafter referred to as display wavelength range, at least at the observing time and transmitting exposure light for representing an image at least at the light exposure time. The transmitting indicates a state of full light beam transmittance of 30% or more, preferably 50% or more.

Figure 19:
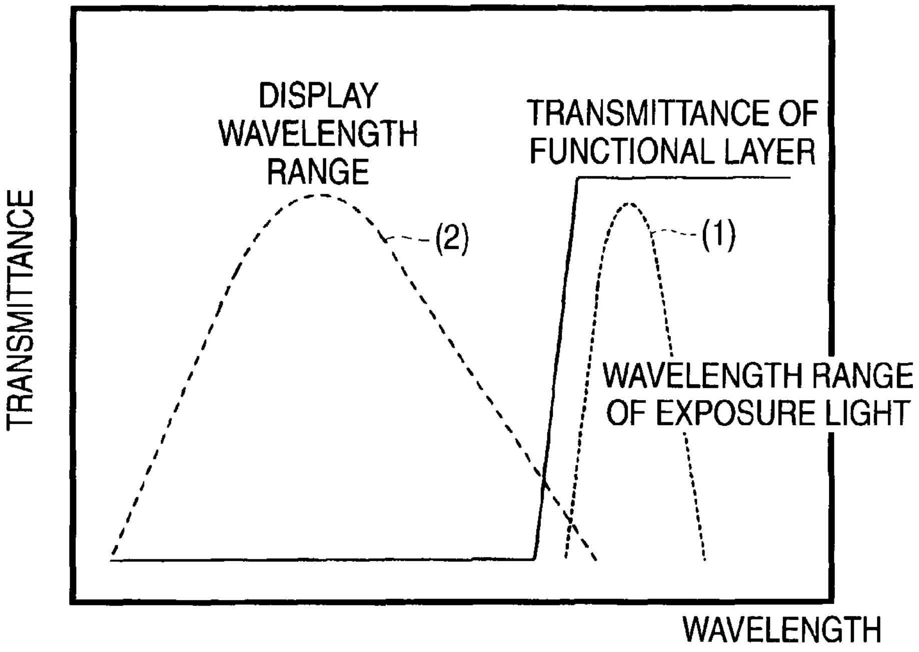
FIG. 19 is a schematic drawing to show the spectral transmittance characteristic of a functional layer, the wavelength range of exposure light for representing an image, and the display wavelength range.

FIG. 19 is a schematic drawing to show the spectral transmittance characteristic of the functional layer, the wavelength range of exposure light for representing an image, and the display wavelength range.

In FIG. 19, the vertical axis represents the transmittance, the horizontal axis represents the wavelength, a solid line in the figure represents the spectral transmittance characteristic of the functional layer, a dotted line (1) represents the wavelength range of exposure light, and a dotted line (2) represents the display wavelength range. As seen in the figure, the transmission spectrum of the functional layer shields light in the display wavelength range and transmits light in the wavelength range of exposure light.

The spectral transmittance characteristic of the functional layer and the wavelength range of exposure light are thus set, so that the above-mentioned conditions are satisfied.

Here, the example wherein the wavelength range of exposure light for representing an image is positioned on the longer wavelength side than the display wavelength range has been shown. However, the wavelength range of exposure light may be positioned on the shorter wavelength side than the display wavelength range. If the wavelength range of exposure light for representing an image lies within the visible wavelength range, lack of hiding occurs in the wavelength range and therefore it is desirable that the wavelength range of exposure light should be outside the visible wavelength range, namely, be in the wavelength range of not more than 400 nm or not less than 700 nm. Generally, the wavelength range of 400 nm to 800 nm is said to be visible wavelength range, but low visibility is provided in the wavelength range of 700 nm to 800 nm and thus the wavelength range of exposure light may lie in the above-mentioned range and more preferably the wavelength range of exposure light for representing an image can be placed in 800 nm or more. In case of setting the wavelength range of exposure light for representing an image within the visible wavelength range, preferably the width of the wavelength range of exposure light is narrower for the purpose of suppressing the degree of lack of hiding and the width is set to 100 nm or less, more preferably 50 nm or less.

Preferably, the transmittance of the functional layer in the display wavelength range is 10% or less; more preferably 1% or less. If the functional layer transmits the wavelength range of exposure light for representing an image, the display wavelength range may overlap the wavelength range of exposure light. However, when a visible image is recorded on the image record layer of the rear surface, the visible image is recorded on the image record layer of the front surface overlaps, causing crosstalk to occur. Therefore, preferably the overlap between the display wavelength range and the wavelength range of exposure light is smaller.

As a method of controlling the transmittance of the functional layer by wavelength range, a method of using wavelength dependency of the reflectivity or a method of using wavelength dependency of the absorption factor is available. The former method can be realized, for example, by using a dielectric multilayer film, a cholesteric liquid crystal having selective reflection, or the like as the functional layer and the latter method can be realized, for example, by a color material containing dye or pigment having an appropriate absorption spectrum or a phase difference plate sandwiched between two light polarizers polarizer as the functional layer.

Referring again to FIG. 18, a description will be given.

As the functions of the functional layer 18, a background function is required in addition to the selective transmission function described above. The optical requirement as the background function varies depending on which optical change the image record layer 104A, 104B uses. For example, if the image record layer 104A, 104B uses absorption factor change, white scattering property is required; if the image record layer 104A, 104B uses reflectivity change, light absorption property is required; or if the image record layer 104A, 104B uses scattering coefficient change, mirror reflection property is required. Thus, proper selection needs to be made in response to the image record layer 104A, 104B. A light absorption material and a light reflection material can also be laminated as required.

The materials that can be used as the image record layer 104A, 104B are roughly classified into a material for producing optical change only upon application of exposure light and a material for producing optical change when another external irritation of electricity, magnetism, heat, electromagnetic wave, light different in wavelength from the exposure light, or the like is added at the same time.

As the material for producing optical change only upon application of exposure light, for example, a liquid crystal composition containing a photoresponsive compound, etc., can be used. As the photoresponsive compound, for example, a photoisomerization material such as an azobenzene compound, a spiropyran compound, or a fulgide compound can be used. As the liquid crystal composition, memory-property liquid crystal such as chiral nematic liquid crystal, smectic A liquid crystal, chiral smectic C liquid crystal, bistable twisted nematic liquid crystal, or fine particle dispersion liquid crystal can be used. To aid in optical change of liquid crystal, a passive optical part such as a polarizing plate, a phase difference plate, a color filter, or a reflecting plate may be used together or dichromatic dye may be added into the liquid crystal.

As the image record layer 104A, 104B, not only the above-described material for producing optical change only upon application of exposure light, but also a material for producing optical change upon application of a minute amount of exposure light when another external irritation of electricity, magnetism, heat, electromagnetic wave, light different in wavelength from the exposure light, or the like is added at the same time can be used.

Generally, the material for producing optical change as another external irritation of electricity, magnetism, heat, electromagnetic wave, light different in wavelength from the exposure light, or the like is added at the same time involves problems of poor maintainability of an image in a bright area and being hard to selectively write the front and rear surfaces. These problems can be solved to some extent by providing the amount of light for producing optical change with a threshold characteristic or making different the sensitivity wavelength for producing optical change. However, the external irritation can be used together to easily solve the problems. That is, while exposure light for representing an image is being applied, external irritation is added to either of the front and rear surface of image record layers, whereby a visible image can be recorded selectively on the image record layer to which the external irritation is added. Among the external irritations, the electric irritation is excellent particularly in controllability and thus is preferred.

Figure 20:
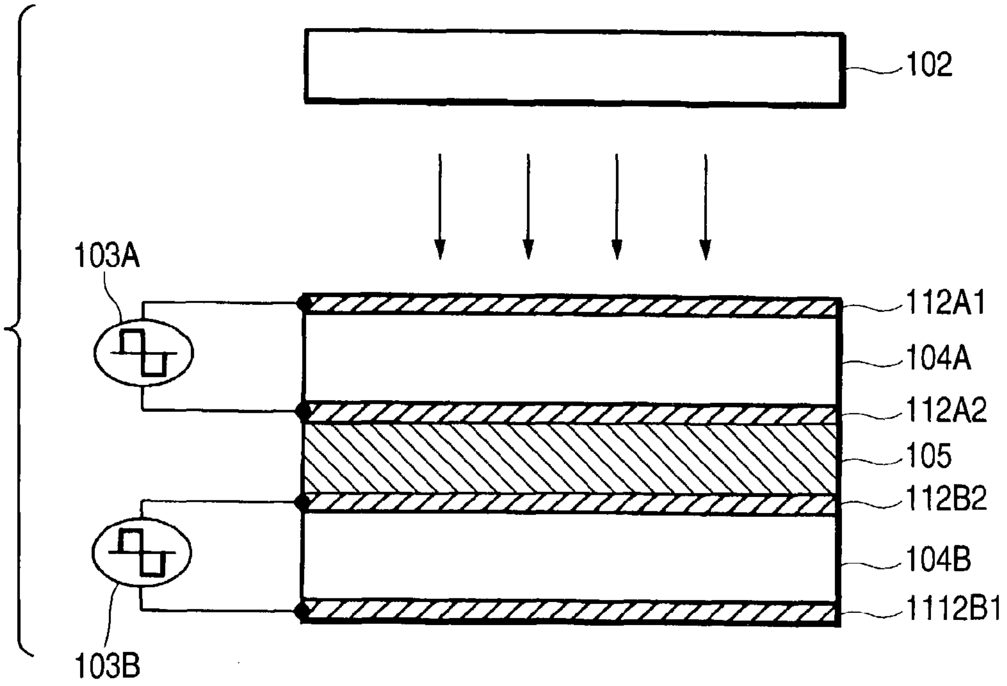
FIG. 20 is a drawing to show the image record medium for producing optical change as an electric field is also applied to image record layer at the same time.

FIG. 20 is a drawing to show the image record medium for producing optical change as an electric field is also applied to the image record layer at the same time.

The image record medium 101 shown in FIG. 20 comprises electrodes 112A1 and 112A2 so as to sandwich the surface image record layer 104A therebetween and likewise electrodes 112B1 and 112B2 so as to sandwich the back image record layer 104B therebetween. In case of recording a visible image on the image record layer 104A, 104B, the electrode 112A1, 112A2 is connected to voltage application unit 103A and the electrode 112B1, 112B2 is connected to voltage application unit 103B. Exposure light is applied from the light exposure unit 102 and, for example, if user wishes to record a visible image on the image record layer 104A, a pulse electric field is applied to the image record layer 104A; if the user wishes to record a visible image on the image record layer 104B, a pulse electric field is applied to the image record layer 104B.

The electrodes 112A1 and 112B1 need not necessarily be integral with the image record medium 101; the image record layer 104A and the electrode 112A1 and the image record layer 104B and the electrode 112B1 may be separated, so that the image record layer 104A, the electrode 112A2, the functional layer 105, the electrode 112B2, and the image record layer 104B may make up the image record medium 101. Accordingly, the image record medium 101 can be slimmed and be reduced in costs.

Thus, as the material of the image record layer for recording a visible image by using application of exposure light for representing an image and the electric irritation in combination, for example, a liquid crystal composition containing a photoresponsive compound, etc., can be used. As the photoresponsive compound, for example, a photoisomerization material such as an azobenzene compound, a spiropyran compound, or a fulgide compound can be used. As the liquid crystal composition, memory-property liquid crystal such as chiral nematic liquid crystal, smectic A liquid crystal, chiral smectic C liquid crystal, bistable twisted nematic liquid crystal, or fine particle dispersion liquid crystal can be used. To aid in optical change of liquid crystal, a passive optical part such as a polarizing plate, a phase difference plate, a color filter, or a reflecting plate may be used together or dichromatic dye may be added into the liquid crystal. Generally, the materials have a threshold characteristic that optical change occurs rapidly at one threshold value relative to the electric field intensity, and the threshold value changes upon application of exposure light. Using the phenomenon, the advantage that optical change is produced according to a lower exposure light amount than that for producing optical change only upon application of exposure light can be provided.

As described above, the invention makes it possible to prevent transmission from the rear surface and record an image on both sides of the front and back surfaces as the functional layer selectively transmits an optical image exposed at the light exposure time. As one means for the functional layer to selectively transmit exposure light for representing an image, the wavelength of the exposure light and the image display wavelength are set to different wavelengths and the functional layer transmits the wavelength of the exposure light, whereby the function is provided. The functional layer is externally irritated, whereby the transmittance is made variable and external irritation is added only at the light exposure time, thereby placing the functional layer in a transmission state, so that the function is provided. Further, if separate images cannot be recorded on both sides, there is any point in double-sided recording. Thus, as means for recording separate images on both sides, in the invention, the electric field application unit for applying an electric field to the image record layer is provided and an electric fields are applied separately at the same time as light exposure or the applied threshold electric field is changed, whereby an image can be selectively recorded on any of the front and rear surfaces of the image record layers.

Next, an image record medium of a fourth embodiment of the invention will be discussed.

The image record medium of the fourth embodiment differs from the image record medium of the third embodiment only in that an image record layer is functionally separated into a display layer whose optical characteristic changes upon application of an electric field and a photoconductive layer whose electric characteristic changes upon application of exposure light for representing an image and that separate visible images are recorded on the image record layers by applying exposure light and applying an electric field, respectively. Therefore, components identical with those previously described with reference to FIGS. 18 to 20 are denoted by the same reference numerals in FIGS. 21 and 22 and only the difference will be discussed.

Figure 21:
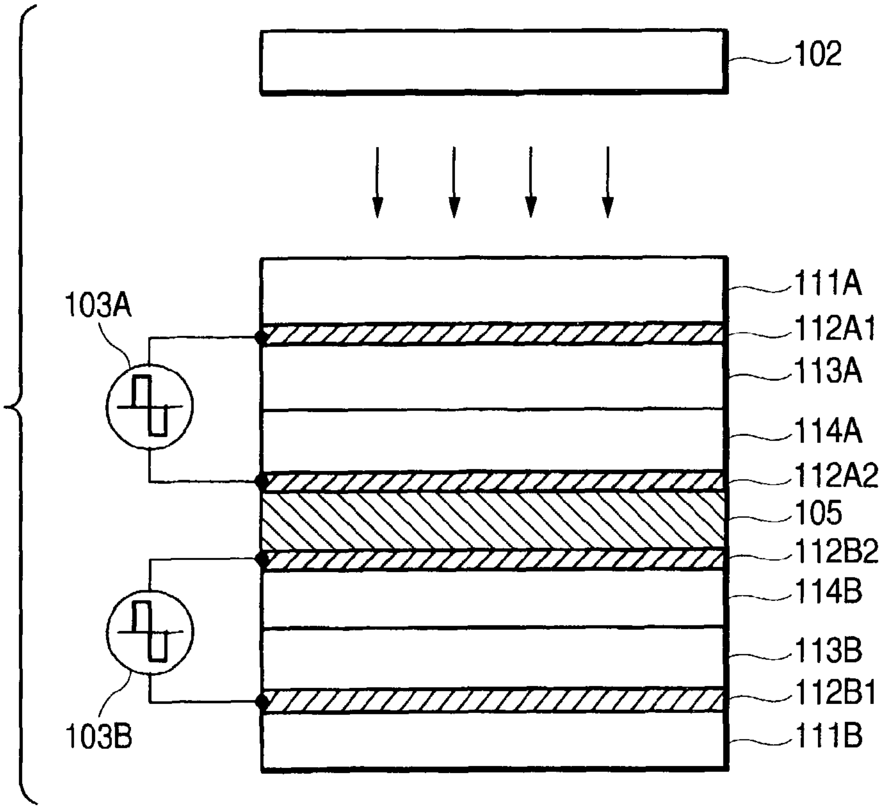
FIG. 21 is a drawing to show an example of an image record medium of a fourth embodiment of the invention.

FIG. 21 is a drawing to show an example of the image record medium of the fourth embodiment of the invention.

The image record medium shown in FIG. 21 comprises two layers of a front surface image record layer and a rear surface image record layer and a functional layer 105. The front surface image record layer forms a laminate of a display layer 113A made of an optical material having electric responsivity and a photoconductive layer 114A made of a photoelectric material. Likewise, the rear surface image record layer forms a laminate of a display layer 113B made of an optical material having electric responsivity and a photoconductive layer 114B made of a photoelectric material. Electrodes 112A1 and 112A2 are formed so as to sandwich the display layer 113A and the photoconductive layer 114A therebetween, and electrodes 112B1 and 112B2 are formed so as to sandwich the display layer 113B and the photoconductive layer 114B therebetween. The electrodes 112A1 and 112B1 are formed on transparent substrates 111A1 and 111B1 respectively.

Figure 22:
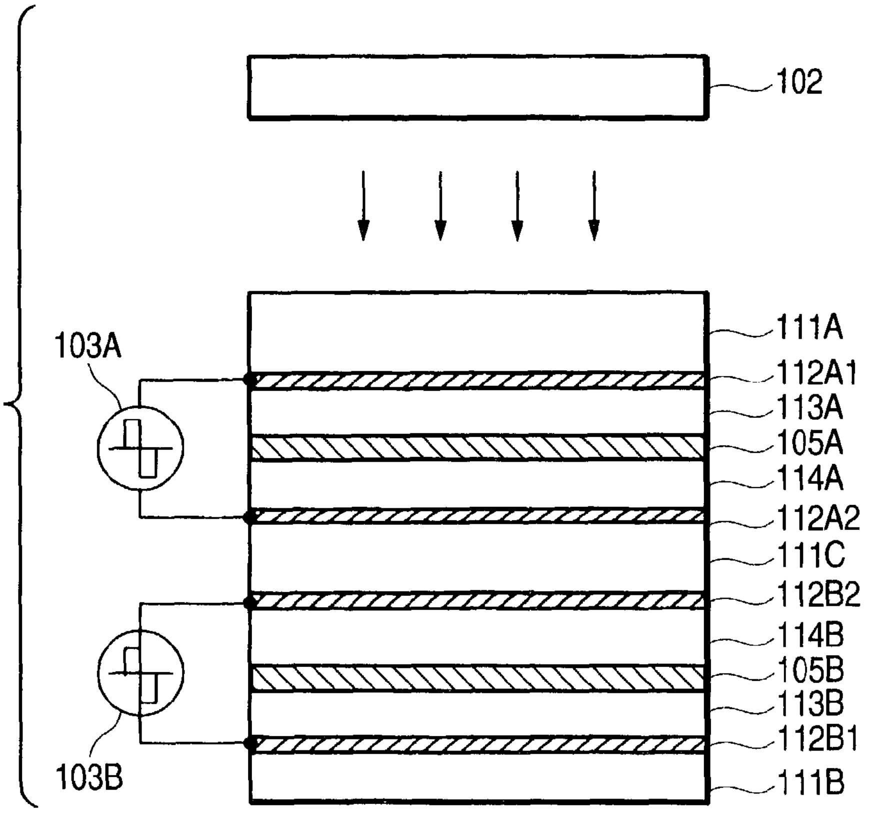
FIG. 22 is a drawing to show another example of the image record medium of the fourth embodiment of the invention.

FIG. 22 is a drawing to show another example of the image record medium of the fourth embodiment of the invention.

The image record medium of the example differs from the image record medium shown as an example in FIG. 21 only in that a functional layer is placed between a display layer and a photoconductive layer. Therefore, components identical with those previously described with reference to FIG. 21 are denoted by the same reference numerals in FIG. 22 and only the difference will be discussed.

In FIG. 22, a functional layer 105A is placed between a display layer 113A and a photoconductive layer 114A and a functional layer 105B is placed between a display layer 113B and a photoconductive layer 114B. Substrates 111A and 111B are added as aid members for improving the mechanical strength and protecting the surface.

When the electrodes 112A2 and 112B2 comprise powder of transparence conductive material such as indium oxide and tin oxide and conductive coating material in which coloring matter such as pigment and dye is dispersed and dissolved into resin matrix, the electrodes 112A2 and 112B2 can also serve as functional layers 105 in place of the functional layers 105A and 105B.

As shown in FIGS. 21 and 22, when the two image record layers are functionally separated into the display layers 113A and 113B and the photoconductive layers 114A and 114B, if the functional layer 105 is placed between the display layers 113A and 113B, the scene can be shielded when a visible image is observed.

Materials similar to those of the liquid crystal layer 3 and the photoconductor layer 4 in the image record medium according to the first embodiment may be used for the display layer having electric responsivity and the photoconductor layer in the image record media according to the third and fourth embodiments and fifth and sixth embodiments described later.

The functional separation is thus made, so that the advantages that the sensitivity to the exposure light amount can be enhanced, that it is made possible to write in a low electric field, and that material options are widened can be provided.

Next, an image record medium of a fifth embodiment of the invention will be discussed.

The image record medium of the fifth embodiment differs from the image record medium of the fourth embodiment only in that two image record layers are made different in threshold value for electric irritation and an electric field is applied to the two image record layers in batch. Therefore, components identical with those previously described with reference to FIGS. 21 and 22 are denoted by the same reference numerals in FIGS. 23 and 24 and only the difference will be discussed.

Figure 23:
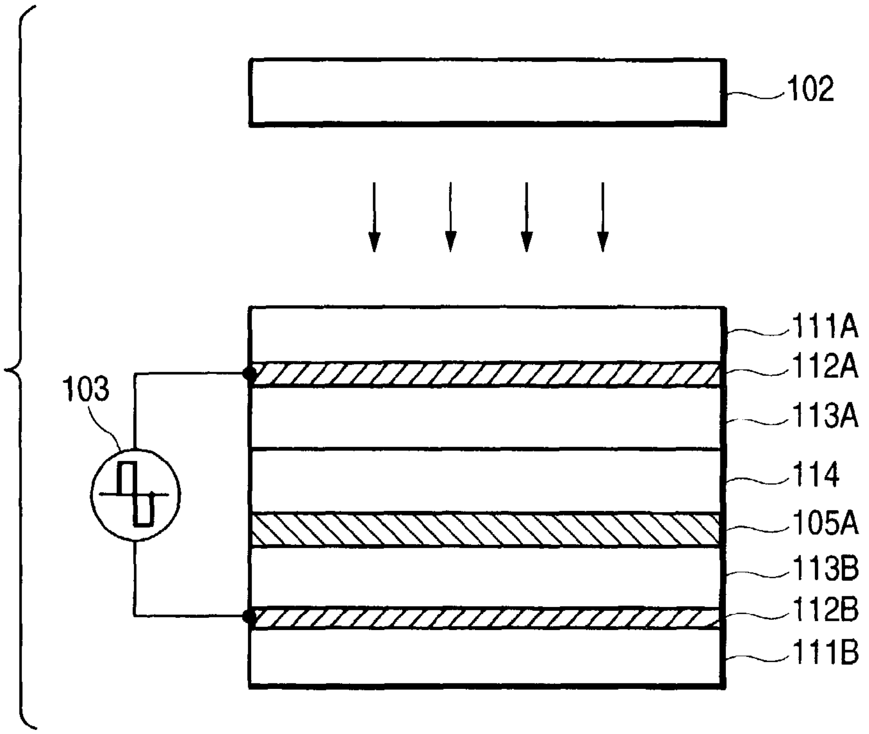
FIG. 23 is a drawing to show an example of an image record medium of the fifth embodiment of the invention.

FIG. 23 is a drawing to show an example of the image record medium of the fifth embodiment of the invention.

As shown in FIG. 23, the image record medium 101 comprises a display layer 113A, a photoconductive layer 114, a functional layer 105, and a display layer 113B, which are sandwiched between electrodes 112A and 112B. In case of recording a visible image on the image record medium 101, a voltage application unit 103 for applying an electric field to the display layers 113A and 113B and the photoconductive layer 114 is connected to the electrodes 112A and 112B.

In the embodiment, for example, a cholesteric liquid crystal having a selective reflection characteristic in a visible wavelength range is used as the display layer 113A, 113B and further the materials used as the display layers 113A and 113B differ in dielectric anisotropy and orientation elastic modulus. Consequently, the display layers 113A and 113B have different threshold characteristics of change in optical characteristic.

Figure 24:
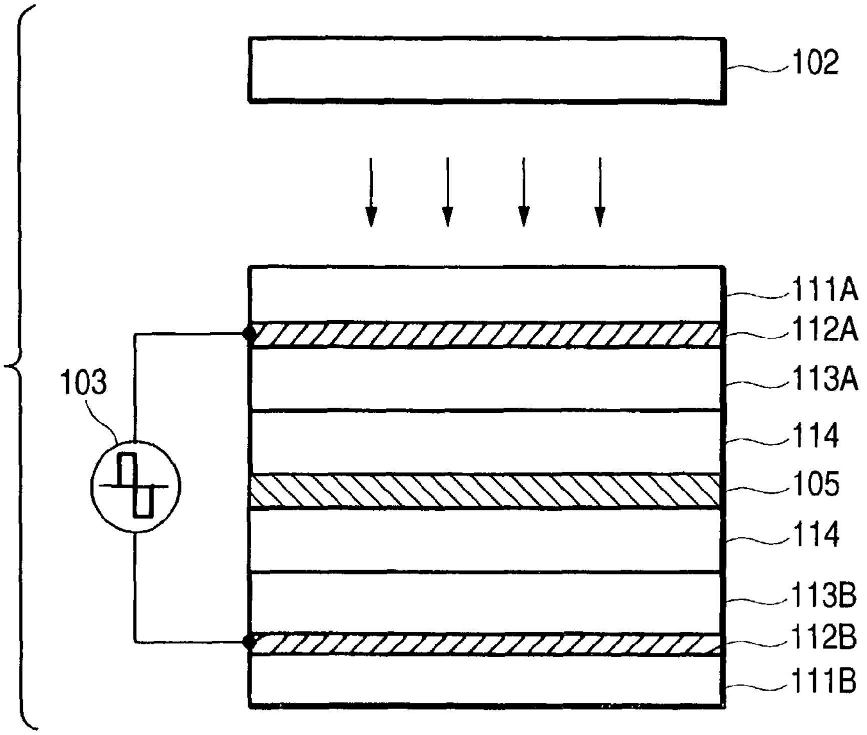
FIG. 24 is a drawing to show another example of the image record medium of the fifth embodiment of the invention.

FIG. 24 is a drawing to show another example of the image record medium of the fifth embodiment of the invention.

The image record medium shown in FIG. 24 differs from the image record medium shown in FIG. 23 only in that a photoconductive layer is placed on each of two image record layers. Therefore, components identical with those previously described with reference to FIG. 23 are denoted by the same reference numerals in FIG. 24 and will not be discussed again.

The example has the advantage that the image record medium comprises the photoconductive layers formed on both sides of a functional layer and can be comparatively easily manufactured.

As shown in FIGS. 23 and 24, in case of separating the image record layer functionally into two or more members, so long as the layers whose optical characteristic changes (here, the display layers 113A and 113B) finally are partitioned by the functional layer 105, the photoconductive layer may be placed on both sides of the functional layer 105 as shown in FIG. 24 or may be placed on one side of the functional layer 105 as shown in FIG. 23.

Figure 25:
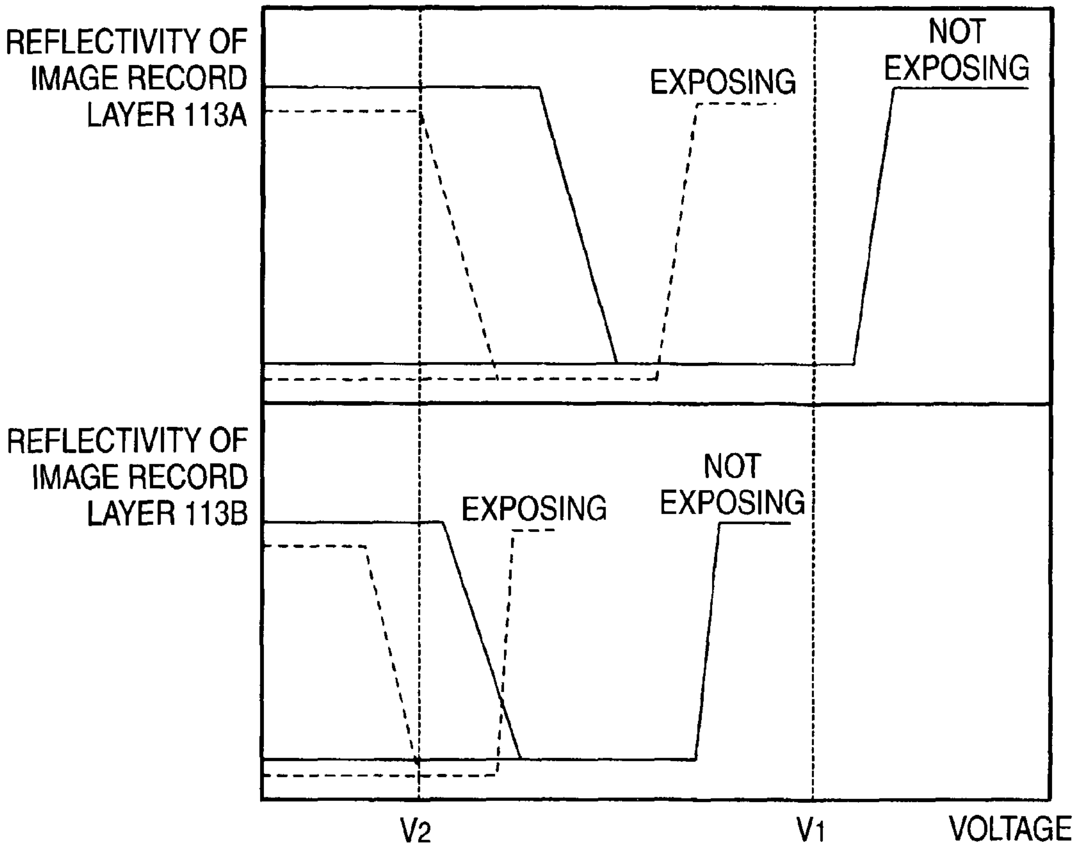
FIG. 25 is a schematic drawing to show the voltage reflectivity characteristic of each of the image record layers of the embodiments.

FIG. 25 is a schematic drawing to show the voltage-reflectivity characteristic of each of the image record layers of the fifth embodiment.

In FIG. 25, the vertical axis represents the reflectivity of the image record layer, the horizontal axis represents the voltage applied to the image record layer, an upper stage represents the voltage-reflectivity characteristic of the image record layer on a rear side away from the exposure light source, and a lower stage represents the voltage-reflectivity characteristic of the image record layer on a front surface side close to the exposure light source. A solid line in the figure represents a state in which exposure light is not applied from the light exposure unit and a dotted line represents a state in which exposure light is applied from the light exposure unit. Voltages V1 and V2 represent two types of voltages applied in batch to the two image record layers.

As the voltage-reflectivity characteristic is shown in the figure, for example, the display layer 113A can be set to a higher threshold voltage than the display layer 113B. Each layer of the image record medium can be represented by an equivalent circuit comprising a resistor and a capacitor, and the image record medium of the embodiment comprising the display layer 113A, the photoconductive layer 114, and the display layer 113B can be thought as the equivalent circuits connected in series. When an electric field is applied between the electrodes 112A and 112B and exposure light is applied from the light exposure unit 102, the resistance value of the photoconductive layer 114 lowers and thus the partial voltage to the display layer 113A, 113B rises and the voltage-reflectivity characteristic shifts to the low-voltage side indicated by the dotted line in the figure.

In case of recording a visible image on both sides using the described image record medium, for example, exposure light for representing a visible image to be recorded on the display layer 113A is applied from the light exposure unit 102. The voltage V1 is applied from the voltage application unit 103 while the exposure light is being applied, whereby the visible image is recorded on the display layer 113A. Next, the voltage is set to zero and exposure light for representing a mirror-image reverse image of a visible image to be recorded on the display layer 113B is applied from the light exposure unit 102. The voltage V2 is applied from the voltage application unit 103 while the exposure light is being applied, whereby the visible image is recorded on the display layer 113B.

Next, an image record medium of a sixth embodiment of the invention will be discussed.

Figure 26:
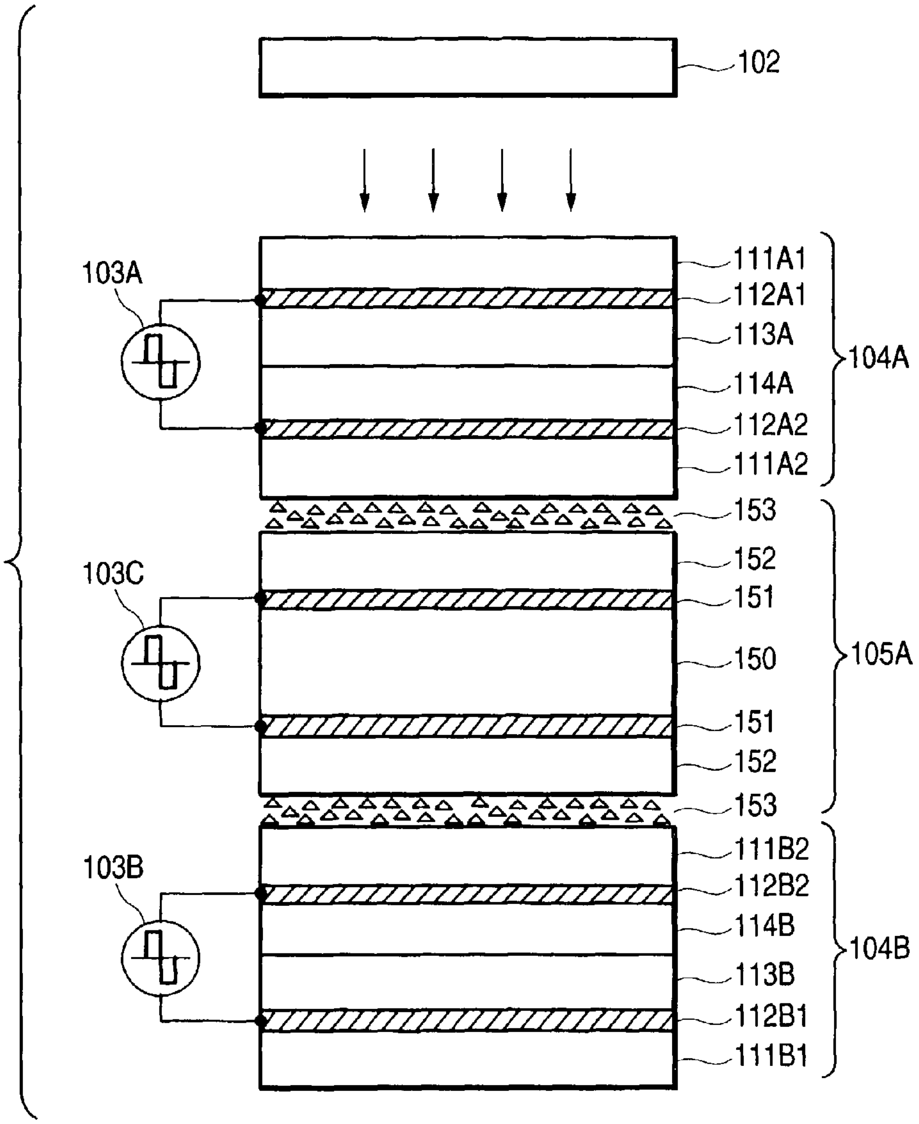
FIG. 26 is a drawing to show an example of an image record medium of a sixth embodiment of the invention.

FIG. 26 is a drawing to show an example of the image record medium of the sixth embodiment of the invention.

The image record medium of the sixth embodiment differs from the image record medium of the fourth embodiment in that a functional layer is implemented as a liquid crystal layer sandwiched between electrodes and a voltage is applied between the electrodes, whereby the transmittance changes. Therefore, components identical with those previously described with reference to FIGS. 21 and 22 are denoted by the same reference numerals in FIG. 26 and only the difference will be discussed.

The image record medium shown in FIG. 26 comprises a functional layer 105A of which transmittance changes in response to external irritation, placed between image record layers 104A and 104B.

The functional layer 105A comprises a liquid crystal layer 150 sandwiched between two electrodes 151 of two substrates 152 on which the electrodes 151 are formed, and is deposited between the image record layers 104A and 104B each via an adhesive layer 153.

When visible light such as sunlight or a room lamp is applied to the liquid crystal layer 150, the liquid crystal layer 150 absorbs the light, lowers in transmittance, becomes dark, and can shield the scene; when an electric field is applied to the liquid crystal layer 150, the liquid crystal layer 150 rises in transmittance and becomes transparent. Therefore, when a visible image is recorded on the image record layer, an electric field is applied to the liquid crystal layer 150 for transmitting exposure light representing the image applied from the light exposure unit and after the visible image is recorded, the applied voltage is canceled and the liquid crystal layer 150 absorbs visible light, becomes dark, and shields the scene, so that the contrast of the recorded visible image can be increased.

In the embodiment, the example wherein the external irritation of electricity is given to the functional layer has been described. However, the external irritation is not limited to the irritation of electricity and may be any other external irritation of magnetism, heat, electromagnetic wave, light different in wavelength from the exposure light, or the like. A material or a composite material such that the transmittance of the functional layer 105 changes upon reception of any of the external irritations can be used to form the functional layer 105.

For example, in case of using heat as the external irritation, a thermo chromic material such as leuco dye can be used; in case of using light different in wavelength from the exposure light, a photo chromic material such as a spiropyran compound can be used. Among the external irritations, the electric irritation provides the best controllability and can be preferably used.

Methods of controlling change in the transmittance are roughly classified into a method of using reflectivity change and a method of using absorption factor change. In the former, for example, a holographic polymeric dispersion liquid crystal element, a cholesteric liquid crystal using selective reflection, or the like can be used. In the latter, for example, (1) a liquid crystal display system such as guest host liquid crystal or a liquid crystal display element of the type wherein liquid crystal is sandwiched between two polarizing plates such as a twisted nematic system, a super twisted nematic system, or an electrically controlled birefringence system, (2) an electro chromic element such as a tungstic oxide family or a biorogen family, (3) a dispersed particle rotation type display element, or the like can be used.

Next, an image record apparatus of a seventh embodiment of the invention will be discussed.

Figure 27:
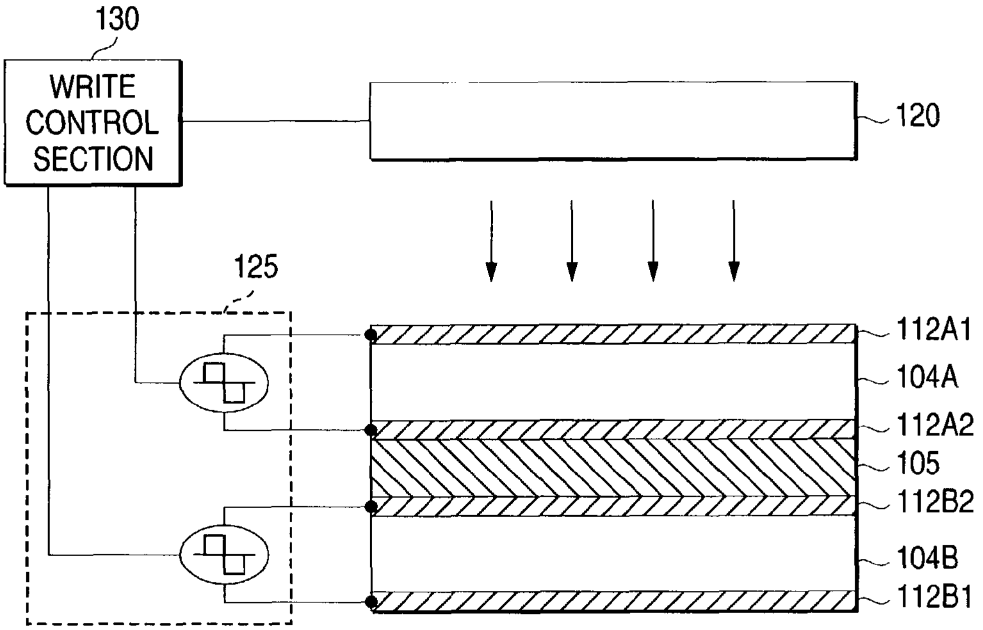
FIG. 27 is a drawing to show an image record apparatus of a seventh embodiment of the invention.

FIG. 27 is a drawing to show the image record apparatus of the seventh embodiment of the invention.

As shown in FIG. 27, the image record apparatus comprises an exposure section 120 for applying exposure light to an image record medium, an electric field application section 125 for applying an electric field for writing an image to an image record layer forming a part of disposed image record medium, and a write control section 130 for controlling the exposure section 120 and the electric field application section 125.

The exposure section 120 uses an LED sheet array for emitting infrared light and applies exposure light representing an image to an image record medium 101 via a photomask. The electric field application section 125 applies pulse voltages for writing images to each of two image record layers 104A and 104B of the image record medium 101, respectively. The write control section 130 controls a timing of the exposure light applied from the exposure section 120, an exposure light amount, and a light exposure time, changes the magnitude of the pulse voltage applied from the electric field application section 125 in response to a type of image record medium 101, and controls switching of the image record layers 104A and 104B to which an electric field is applied.

In the embodiment, the exposure section 120 uses an LED sheet array for emitting infrared light, but a light source and a method similar to those of the light exposure unit 102 of the third embodiment can be used as the means for applying exposure light representing an image to the image record medium 101.

Here, the example wherein a visible image is recorded on the image record medium of the third embodiment shown in FIG. 20 has been described. However, the image record apparatus of the seventh embodiment can record a visible image on any of the image record media previously described with reference to FIGS. 21 to 25 and 27 as the fourth to sixth embodiments.

Figure 28:
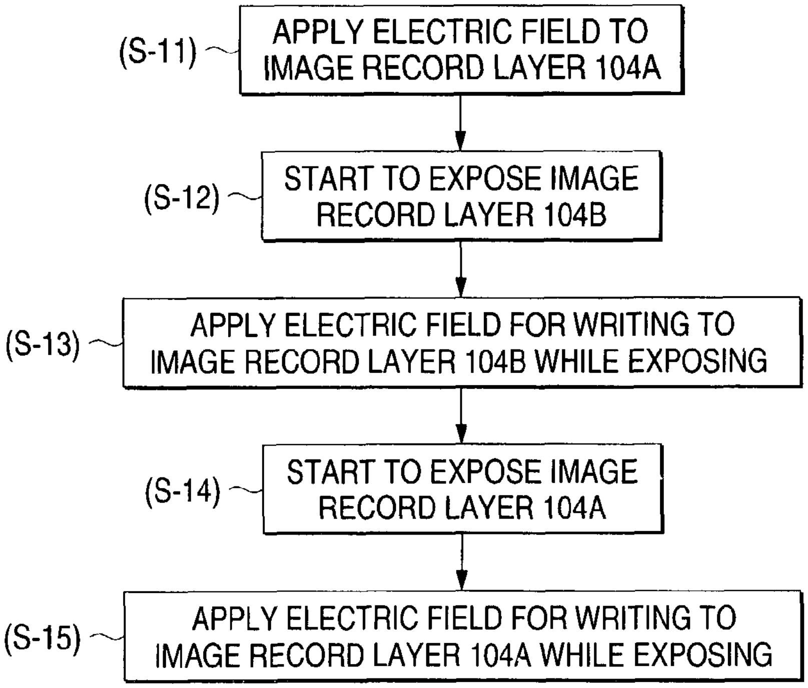
FIG. 28 is a flowchart to show a control flow of a write control section.

FIG. 28 is a flowchart to show a control flow of the write control section.

In FIG. 28, to begin with, before a visible image is recorded on an image record medium, the image record medium 101 on which the visible image is to be recorded is set in the image record apparatus. Next, a reset electric field for resetting to record a uniform initial image is applied to the image record layer 104A close to the exposure light source for a predetermined time (S-11). Next, light exposure is started to apply exposure light representing a mirror image of the visible image to be recorded on the image record layer 104B away from the exposure light source to the image record medium (S-12). While light exposure is being conducted, a write electric field is applied to the image record layer 104B and an electric field improper to write is applied to the image record layer 104A for a predetermined time and after the expiration of the predetermined time, the exposure light is turned off and applying the electric field is shut off (S-13).

The expression "an electric field improper to write is applied" is used to mean that if the image record medium is any of the image record media of the third, fourth, and sixth embodiments and a write electric field is applied to each image record layer separately, the electric field is set to zero or the electrodes of the image record medium is placed in a float state from the electric field application section. The expression "an electric field improper to write is applied" is used to mean that if the image record medium is the image record medium of the fifth embodiment and an electric field is applied in batch to the two image record layers and the write electric field varies from one image record layer to another, the voltage V1 or V2 previously described with reference to FIG. 25 is applied.

Next, light exposure is started to apply exposure light for representing the visible image to be recorded on the image record layer 104A close to the exposure light source (S-14). While light exposure is being conducted, a write electric field is applied to the image record layer 104A and an electric field improper to write is applied to the image record layer 104B for a predetermined time and after the expiration of the predetermined time, the exposure light is turned off and applying the electric field is shut off (S-15).

A predetermined light amount of exposure light can also be applied for resetting instead of applying a reset electric field for resetting to record a uniform initial image for a predetermined time (S-11). The visible image can also be earlier recorded on the image record layer close to the exposure light source by adjusting the light amount of exposure light, etc., instead of adopting the sequence of earlier recording the visible image on the image record layer away from the exposure light source before the visible image is recorded on the image record layer close to the exposure light source.

For the image record layer to produce optical change, it is indispensable for the image record layer itself to absorb light. However, the exposure light amount of the image record layer 104B away from the exposure section 120 becomes inevitably smaller than the exposure light amount of the image record layer 104A close to the exposure section 120 and thus when an image is recorded on the image record layer 104B, the exposure light amount is made larger than that when an image is recorded on the image record layer 104A, whereby the visible images can be recorded in uniform density on both sides of the image record medium. The exposure light amount can be adjusted by changing the light exposure time or the light exposure intensity; often the former may produce the better result.

In case of recording a visible image on the image record layer 104B, the visible image may be affected by the image record layer 104A onto which a visible image has already been written. For example, if each of image record layers 104A and 104B comprises a laminate of a cholesteric liquid crystal and a photoconductor, a bright display portion and a dark display portion differ in scattering coefficient and therefore the intensity of exposure light for representing an image and resolution undergo modulation and crosstalk can occur in the visible image on the image record layer 104B. This problem can be solved by using the sequence of (1) resetting the surface image record layer 104A to a uniform state of full white, full black, etc., (S-11), (2) earlier recording an image on the rear surface image record layer 104B (S-13), and then (3) recording an image on the front surface image record layer 104A (S-15) in the control flow of the write control section described above.

If each of image record layers 104A and 104B comprises a laminate of a cholesteric liquid crystal and a photoconductor, when an image is recorded on the rear surface image record layer 104B, the visible image may be blurred because the cholesteric liquid crystal has a light scattering property. To solve this problem, light scattering can be suppressed by adding an electric filed to the image record layer 104A (S-11), whereby the blur of the visible image can be decreased. In this case, as the electric field intensity is higher, the light scattering property is more largely suppressed accordingly and the maximum transparency can be provided by applying the transition threshold electric field of focal conic orientation-homeotropic orientation or more.

Next, examples of actually recording visible images using the embodiments of the image record media of the invention and the embodiments of the image record apparatus of the invention will be discussed.

EXAMPLE 1

An example 1 is an example using the image record medium of the fourth embodiment of the invention (FIG. 22) and the image record apparatus of the seventh embodiment of the invention.

As the image record medium of the example, a polyethylene terephthalate (PET) resin film 125 μm thick was used as a substrate 111C and ITO (Indium Tin Oxide) 100 nm thick was evaporated on both sides thereof by sputtering to form the electrodes 112A2 and 112B2.

Each of the photoconductive layers 114A and 114B was of a three-layer structure having a first charge generation layer, a charge transport layer, and a second charge generation layer. To begin with, dip coating with an alcohol solution of a polyvinyl butyral resin in which a phthalocyanine pigment family charge generation material was dispersed was performed to form the first charge generation layer having 0.1 μm thick. Next, dip coating with a chlorobenzene solution of a phenylamine family charge transport material and a polycarbonate resin was performed to form the charge transport layer having 3 μm thick. Last, again dip coating with an alcohol solution of a polyvinyl butyral resin in which a phthalocyanine pigment family charge generation material was dispersed was performed to form the second charge generation layer having 0.1 μm thick, thereby providing the photoconductive layers 114A, 114B. The photoconductive layer 114A, 114B showed photoconductivity relative to light having a wavelength ranging from 500 to 900 nm.

Next, dip coating with a water solution of black dye PC-Black-006P (manufactured by Nippon Kayaku Co., Ltd.) and polyvinyl alcohol was performed to form the functional layer 105A, 105B having 2 μm thick. The black dye PC-Black-006P absorbed wavelengths 400 to 700 nm and transmitted the wavelength 700 nm or more.

Next, a polyethylene terephthalate resin film having 125 μm thick was used as substrate 111A and ITO (Indium Tin Oxide) having 100 nm thick was evaporated on both sides thereof. A cholesteric liquid crystal microcapsule paint was applied thereonto to form the display layer 113A having 30 μm in thickness. An adhesive was applied to all sides of this substrate and this substrate was superposed on the side of the functional layer 105A of the substrate 111C formed with the functional layer described above and the substrates were put on each other through a laminator. Likewise, the substrate 111B formed with the electrode 112B1 and the display layer 113B was put on the side of the functional layer 105B. The cholesteric liquid crystal microcapsule paint was provided as follows: To begin with, proper amounts of chiral agent R1011 (manufactured by Merck KGaA) and chiral agent R811 (manufactured by Merck KGaA) were added to nematic liquid crystal E44 (manufactured by Merck KGaA) to prepare cholesteric liquid crystal so that the peak wavelength of selective reflection becomes 550 nm. Polyisocyanate compound Takenate D-110N (manufactured by Takeda Chemical Industries, Ltd.) and ethyl acetate were added to the cholesteric liquid crystal to prepare an oil-phase composition and this oil-phase composition was entered in a dilute polyvinyl alcohol water solution and was agitated and emulsified to prepare an o/w type emulsion having a diameter of about 10 μm. This emulsion was heated at 60° C. for three hours to provide microcapsules with polyurethane as wall material. After the microcapsules were centrifugally separated and collected, a polyvinyl alcohol water solution was added to produce the microcapsule paint.

As the light exposure unit 102, an LED sheet array for emitting a wavelength of 780 nm was used as a light source so that the image record medium 101 can be exposed from the substrate 111A side via a photomask. The transmittance of the functional layer 105A, 105B at the wavelength 780 nm was 90%. The light exposure intensity was 500 $\mu W/cm^2$.

The voltage application unit 103A and 103B each comprising a waveform generator and a voltage amplifier are connected to the electrodes 112A1 and 112A2 and the electrodes 112B1 and 112B2, respectively. A symmetrical rectangular wave having a frequency of 10 Hz and a peak value of 270 V can be applied between the electrodes 112A1 and 112A2 and between the electrodes 112B1 and 112B2 for 200 ms.

Images were recorded according to the following procedure: (1) Light exposure was started via a photomask with "A" written, (2) while exposure was being performed, the voltage application unit 103A was turned on for applying a voltage pulse only to the image record layer 104A, (3) the photomask was replaced with a photomask formed with a pattern of inverting a letter of "B" as symmetry like a mirror and exposure was started, and (4) the voltage application unit 103B was turned on for applying a voltage pulse to the image record layer 104B.

The letters "A" and "B" were able to be recorded on the display layers 113A and 113B, respectively according to this procedure.

EXAMPLE 2

An example 2 is an example using the image record medium of the fifth embodiment of the invention (FIG. 24) and the image record apparatus of the seventh embodiment of the invention.

As the image record medium of the example, a black PET resin film having 4 μm thick was prepared as the functional layer 105 and both sides thereof were coated with the photoconductive layers 114A and 114B. The transmittance of the functional layer 105 was 1% or less in the wavelength range of 400 to 800 nm.

Each of the photoconductive layers 114A and 114B was of a three-layer structure having a first charge generation layer, a charge transport layer, and a second charge generation layer. To begin with, dip coating with an alcohol solution of a polyvinyl butyral resin in which a phthalocyanine pigment family charge generation material was dispersed was performed to form the first charge generation layer having 0.1 μm thick. Next, dip coating with a chlorobenzene solution of a phenylamine family charge transport material and a polycarbonate resin was performed to form the charge transport layer having 3 μm thick. Last, again dip coating with an alcohol solution of a polyvinyl butyral resin in which a phthalocyanine pigment family charge generation material was dispersed was performed to form the second charge generation layer having 0.1 μm thick, thereby providing the photoconductive layer 114A, 114B. The photoconductive layer 114A, 114B showed photoconductivity relative to light having a wavelength ranging from 500 to 900 nm.

Next, an ITO evaporated PET resin film having 125 μm thick commercially available was used as the substrate 111A1 and the electrode 112A1 and cholesteric liquid crystal microcapsule paint was applied thereonto to form the display layer 113A. An adhesive was applied to all sides of this substrate and this substrate was superposed on the photoconductive layer 114A, the functional layer 105, and the photoconductive layer 114B and they were put on each other through a laminator. The cholesteric liquid crystal microcapsule paint was provided as follows: To begin with, proper amounts of chiral agent R1011 (manufactured by Merck KGaA.) and chiral agent R811 (manufactured by Merck KGaA) were added to nematic liquid crystal E44 (manufactured by Merck KGaA) to prepare cholesteric liquid crystal so that the peak wavelength of selective reflection becomes 550 nm. Polyisocyanate compound Takenate D-110N (manufactured by Takeda Chemical Industries, Ltd.) and ethyl acetate were added to the cholesteric liquid crystal to prepare an oil-phase composition and this oil-phase composition was entered and was agitated in a 1% polyvinyl alcohol water solution to produce an emulsion having a diameter of about 10 μm. This emulsion was heated at 60° C. for three hours to provide microcapsules with polyurethane as a wall material. After the microcapsules were centrifugally separated and collected, a polyvinyl alcohol water solution was added to produce the microcapsule paint.

Microcapsules were manufactured in a similar manner except that the nematic crystal liquid used as a raw material of the cholesteric liquid crystal was changed to ZLI-4792, and the substrate 111B formed with the display layer 113B and the electrode 112B was manufactured and was superposed on the photoconductive layer 114A, the functional layer 105, and the photoconductive layer 114B and they were put on each other through a laminator, completing the image record medium.

As the light exposure unit 102, an LED array for emitting a wavelength of 630 nm was used as a light source so that the image record medium 101 can be exposed from the substrate 111A side via a photomask. The light exposure intensity was 500 μW/cm$^2$.

The voltage application unit 103A comprising a waveform generator and a voltage amplifier is connected to the electrodes 112A and 112B. A symmetrical rectangular wave having a frequency of 10 Hz can be applied between the electrodes 112A and 112B like pulse for 200 ms.

As the nematic liquid crystal used as the raw material of the cholesteric liquid crystal, the image record layer 113A used E44 having large dielectric anisotropy and the image record layer 113B used ZLI-4792 having small dielectric anisotropy and thus the threshold voltage of the image record layer 113A was higher than that of the image record layer 113B and therefore the voltage-reflectivity characteristic of the image record layers 113A and 113B became the same as those shown in FIG. 25.

Images were recorded according to the following procedure: (1) The light exposure unit 102 was used to execute light exposure via a photomask with "A" written, (2) with light exposure performed, the voltage application unit 103 applied a 600V voltage pulse as the voltage V1, (3) the light exposure unit 102 was used to execute light exposure via a photomask formed with a pattern of inverting a letter of "B" as symmetry like a mirror, and (4) while light exposure was being performed, the voltage application unit 103 applied a 150V voltage pulse as the voltage V2. In step (2), the voltage V1 was applied and thus the image record layer 113B was placed in a high reflectivity state regardless of the exposure light amount, but the image corresponding to the exposure light amount was recorded on the image record layer 113A. In step (4), the voltage V2 was applied. At this voltage, the image record layer 113A is in a bistable state and holds the already recorded image regardless of the exposure light amount. On the other hand, the image corresponding to the exposure light amount was recorded on the image record layer 113B.

The letters "A" and "B" were able to be recorded on the display layers 113A and 113B, respectively according to this procedure.

EXAMPLE 3

An example 3 is an example using the image record medium of the sixth embodiment of the invention (FIG. 26) and the image record apparatus of the seventh embodiment of the invention.

As the image record medium of the example, a commercially available IOT evaporated PET resin film was used as the substrate 111A2 and the electrode 112A2, and the photoconductive layer 114A was formed thereon by coating method.

Each of the photoconductive layers 114A and 114B was of a three-layer structure having a first charge generation layer, a charge transport layer, and a second charge generation layer. To begin with, spin coating with an alcohol solution of a polyvinyl butyral resin in which a phthalocyanine pigment family charge generation material was dispersed was performed to form the first charge generation layer having 0.1 μm thick. Next, coating with a chlorobenzene solution of a phenylamine family charge transport material and a polycarbonate resin was performed with a gap applicator to form the charge transport layer having 3 μm thick. Last, again spin coating with an alcohol solution of a polyvinyl butyral resin in which a phthalocyanine pigment family charge generation material was dispersed was performed to form the second charge generation layer having 0.1 μm thick, thereby providing the photoconductive layer 114A. The photoconductive layer 114A, 114B showed photoconductivity relative to light having a wavelength ranging from 500 to 900 nm.

Next, a commercially available IOT evaporated PET resin film was used as the substrate 111A1 and the electrode 112A1, and a cholesteric liquid crystal microcapsule paint was applied thereonto to form the display layer 113A having 30 μm thick. An adhesive was applied to all sides of this substrate and this substrate was superposed on the side of the photoconductive layer 114A of the substrate 111A2 formed with the functional layers described above and the substrates were put on each other through a laminator. The cholesteric liquid crystal microcapsule paint was provided as follows: To begin with, proper amounts of chiral agent R1011 (manufactured by Merck KGaA.) and chiral agent R811 (manufactured by Merck KGaA.) were added to nematic liquid crystal E44 (manufactured by Merck KGaA.) to prepare cholesteric liquid crystal so that the peak wavelength of selective reflection becomes 550 nm. Polyisocyanate compound Takenate D-110N (manufactured by Takeda Chemical Industries, Ltd.) and ethyl acetate were added to the cholesteric liquid crystal to prepare an oil-phase composition and this oil-phase composition was entered in a dilute polyvinyl alcohol water solution and was agitated and emulsified to prepare an o/w type emulsion having a diameter of about 10 μm. This emulsion was heated at 60° C. for three hours to provide microcapsules with polyurethane as wall material. After the microcapsules were centrifugally separated and collected, a polyvinyl alcohol water solution was added to produce the microcapsule paint.

Next, an adhesive was applied to all sides of the substrate 111A2 formed with the photoconductive layer 114A and the substrate was superposed on the substrate 111A1 formed with the display layer 113A described above and the substrates were put on each other through the laminator, completing one image record layer. Likewise, the other image record layer comprising the substrates 111B1 and 111B2, the electrodes 112B1 and 112B2, the photoconductive layer 114B, and the display layer 113B was completed.

Next, a PET resin substrate 152 having an ITO electrode 151 was provided and a polyvinyl alcohol water solution comprising liquid crystal E44 added dichromatic dye S-344 (Mitsui Chemicals, Inc.) was dispersed in a particle diameter of 10 μm was applied in 30 μm thick and a PET resin substrate 152 having another ITO electrode 151 was bonded and laminated thereto to provide the functional layer 105. The functional layer 105 normally absorbed the wavelengths 400 to 700 nm and showed black appearance; when a voltage was applied between the two electrodes 151, the functional layer 105 became transparent.

A hot melt adhesive having ethylene-vinyl acetate copolymer emulsion was applied on the substrate 111A2 and was dried to laminate-bond the record layer 104A to the functional layer 105. In similar fashion, the record layer 104B and the functional layer 105 are bonded together.

As the light exposure unit 102, an LED array for emitting a wavelength of 630 nm was used as a light source so that the image record medium can be exposed from the substrate 111A side via a photomask. The transmittance of the functional layer 105 at the wavelength 630 nm was 50%. The light exposure intensity was 500 $\mu W/cm^2$.

The voltage application units 103A and 103B each comprising a waveform generator and a voltage amplifier were connected to the electrodes 112A1 and 112A2 and the electrodes 112B1 and 112B2, respectively. Asymmetrical rectangular wave having a frequency of 10 Hz and a peak value of 270 V can be applied between the electrodes 112A1 and 112A2 and between the electrodes 112B1 and 112B2 for 200 ms.

The voltage application unit 103C was connected to the electrodes 151 so that a sufficient voltage for making the functional layer 105 transparent can be applied.

Images were recorded according to the following procedure: (1) Light exposure was started via a photomask with "A" written, (2) the voltage application unit 103A was turned on for applying a pulse only to the image record layer 104A, (3) the voltage application unit 103C was turned on for making the functional layer 105 transparent, (4) the photomask was replaced with a photomask formed with a pattern of inverting a letter of "B" as symmetry like a mirror and light exposure was started, and (5) the voltage application unit 103B was turned on for applying a pulse electric field to the image record layer 104B.

The letters "A" and "B" were able to be recorded on the display layers 113A and 113B, respectively according to this procedure.

According to the image record medium, the image record apparatus, the image record method, and the image record medium holder of the invention, the same image information can be written onto a plurality of image record media at the same time and different pieces of image information can be written consecutively onto the image record media. A plurality of image record media can be inserted into the portable holder, image information can be written and new image information can be rewritten with the holder into which the image record media are inserted, and the holder can be carried. Thus, the inconvenience of attaching the image record media each time image information is written or new image information is rewritten can be decreased and as a plurality of pieces of image information can be provided, the convenience can be enhanced.

Using the double-sided recordable image record medium of the invention, images can be recorded on double sides of the image record medium by one light exposure unit without reversing the image record medium or exposing double sides to light from the light exposure unit. According to the image record apparatus of the invention, there can be provided a double-sided image record apparatus which is small-sized and at low cost and can cover various types of double-sided recordable image record media of the invention.

What is claimed is:

1. An image record apparatus, comprising:

a light application section for applying exposure light, a wavelength range of the exposure light being outside a visible wavelength range, to a plurality of image record media;

a voltage application section for applying an image write voltage to each of the plurality of image record media; and a control section for controlling the light application section and the voltage application section so that exposure light representing an image is applied to the plurality of image record media and the image write voltage is applied to the image record media on which the same visible image as the image is to be recorded, wherein the plurality of image record media, each for recording an image upon application of exposure light and application of a voltage, each includes:

an image record layer on which an image is recorded upon application of exposure light, each image record media having a different image record layer; and a functional layer formed on one side of the image record layer for transmitting the exposure light and transmitting 10% or less of visible light, each of the plurality of image record media being stacked on each other for placement to record a visible image on each of the image record media; and wherein the functional layer is configured to transmit the exposure light from an incidence side of the image record layer to an opposite side at least under the condition that the exposure light is applied, and each of the functional layers shield visible light when the image recorded on the image record layer is observed.

2. The image record apparatus according to claim 1 wherein the control section controls the light application section and the voltage application section so that exposure light is applied to the plurality of image record media and the image write voltage is applied to the plurality of image record media at the same time to record the same visible image on each of the image record media by using the transmitted exposure light, which is transmitted through each of the functional layers.

3. The image record apparatus according to claim 1 wherein the control section controls the light application section and the voltage application section so that an image write process of applying the exposure light representing an image to the plurality of image record media and applying the image write voltage to the image record media on which the same visible image as the image is to be recorded is repeated, and changing to exposure light representing a different image and applying the image write voltage to a different image record media are being conducted, thereby recording each visible image on each of the image record media.

4. The image record apparatus according to claim 1 wherein the control section controls the light application section and the voltage application section so as to reset to record a uniform initial image on the image record media before the visible image is recorded on the image record media.

5. An image record apparatus for recording a visible image on an image record medium, comprising:

an exposure section for applying exposure light, a wavelength range of the exposure light being outside a visible wavelength range, to an image record medium;

a voltage application section for applying an image write voltage to an image record layer forming a part of the image record medium; and a write control section, wherein the image record medium records the visible image upon application of the exposure light and application of the image write voltage;

the image record medium includes:

a first and a second image record layer, the first and second image record layers being different, each of on which the same visible image is recorded upon the application of exposure light, and a functional layer formed between the first and second image record layers for transmitting the exposure light and transmitting 10% or less of visible light; and the write control section is configured to control the exposure section and the voltage application section under a condition that a visible image is recorded on the first image record layer on a front surface side close to the exposure section, exposure light representing the visible image to be recorded on the first image record layer is applied to the image record medium and write voltage and voltage improper to write is applied to the first image record layer and the second image record layer on a rear surface side away from the exposure section, respectively, and under a condition that a visible image is recorded on the second image record layer on the rear surface side, exposure light representing the visible image to be recorded on the second image record layer is applied to the image record medium and write voltage and voltage improper to write are applied to the second image record layer and the first image record layer, respectively;

the functional layer transmits the exposure light from an incidence side of the exposure light to the image record layer on an opposite side to the incidence side at least when the exposure light is applied; and the functional layer shields visible light when the visible image recorded on the image record layer is observed.

6. The image record apparatus according to claim 5 wherein the exposure section changes a light amount of the exposure light under a condition that a visible image is recorded on the first image record layer and the second image record layer of the image record medium.

7. The image record apparatus according to claim 5 wherein the write control section is configured to control the exposure section and the voltage application section to cause the visible image to first be recorded on the second image record layer of the image record medium and the visible image to next be recorded on the first image record layer.

8. The image record apparatus according to claim 5 wherein before the visible image is recorded on the second image record layer of the image record medium, the electric voltage section applies a reset voltage to record a uniform initial image at least to the first image record layer.

9. The image record apparatus according to claim 5, wherein each of the first and second image record layers has a display layer made of a cholesteric liquid crystal with an optical characteristic that changes upon application of voltage for recording a visible image; and the voltage application section records a visible image on the second image record layer under a condition of applying voltage to the first image record layer.

10. The image record apparatus according to claim 5 wherein under a condition of applying exposure light representing an image to the second image record layer, the exposure section causes a mirror image of the visible image to be recorded on the second image record layer.

11. The image record apparatus of claim 1 wherein each of the functional layers is respectively stacked on each of the image record layers.

* * * * *